US010321401B2

(12) United States Patent
Li et al.

(10) Patent No.: US 10,321,401 B2
(45) Date of Patent: Jun. 11, 2019

(54) CLEAR-TO-SEND (CTS) POWER CONTROL IN SIDELINK

(71) Applicant: QUALCOMM Incorporated, San Diego, CA (US)

(72) Inventors: Chong Li, Weehawken, NJ (US); Junyi Li, Chester, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 15/389,320

(22) Filed: Dec. 22, 2016

(65) Prior Publication Data

US 2018/0049129 A1  Feb. 15, 2018

Related U.S. Application Data

(60) Provisional application No. 62/374,557, filed on Aug. 12, 2016, provisional application No. 62/374,448, filed on Aug. 12, 2016.

(51) Int. Cl.
*H04W 52/02* (2009.01)
*H04W 52/32* (2009.01)
(Continued)

(52) U.S. Cl.
CPC ..... *H04W 52/0235* (2013.01); *H04W 52/243* (2013.01); *H04W 52/246* (2013.01);
(Continued)

(58) Field of Classification Search
CPC ........... H04W 52/0235; H04W 52/325; H04W 72/08; H04W 52/383; H04W 52/246;
(Continued)

(56) References Cited

U.S. PATENT DOCUMENTS

| 8,934,353 B2 | 1/2015 | Li et al. | |
|---|---|---|---|
| 2008/0293444 A1* | 11/2008 | Furuskar | H04W 52/265 |
| | | | 455/522 |

(Continued)

FOREIGN PATENT DOCUMENTS

| WO | WO-2015168028 A1 | 11/2015 |
| WO | WO-2016159716 A1 | 10/2016 |

OTHER PUBLICATIONS

Wei Wang, "Power Control for Distributed MAC Protocols in Wireless Ad Hoc Networks", Oct. 2008 (Year: 2008).*

(Continued)

*Primary Examiner* — Brandon M Renner
*Assistant Examiner* — Jay L Vogel
(74) *Attorney, Agent, or Firm* — Loza & Loza, LLP

(57) ABSTRACT

A first device may configure a second device, such as a sidelink receiver, so that an interference protection zone surrounding the second device may be dynamically adjusted in size based, for example, on various objectives and/or use cases recognized by the first device. The interference protection zone may be, for example, an area surrounding the second device, within which neighboring devices may be silenced. Changes to the interference protection zone may be achieved by providing a dynamic clear-to-send (CTS) transmit power scaling parameter, that is different from a pre-assigned constant parameter for CTS power control stored at the second device, to the second device from the first device. The second device may calculate CTS channel power using at least the dynamic CTS transmit power scaling parameter and the received RTS channel power. The second device may send a CTS message in a CTS channel at the calculated CTS channel power.

25 Claims, 18 Drawing Sheets

(51) Int. Cl.
*H04W 72/08* (2009.01)
*H04W 52/38* (2009.01)
*H04W 52/24* (2009.01)
*H04W 76/14* (2018.01)
*H04W 74/08* (2009.01)
*H04W 92/18* (2009.01)
*H04W 52/26* (2009.01)
*H04W 74/00* (2009.01)
*H04W 88/02* (2009.01)
*H04W 88/08* (2009.01)
*H04W 52/28* (2009.01)

(52) U.S. Cl.
CPC ....... *H04W 52/325* (2013.01); *H04W 52/383* (2013.01); *H04W 72/08* (2013.01); *H04W 74/0816* (2013.01); *H04W 76/14* (2018.02); *H04W 92/18* (2013.01); *H04W 52/245* (2013.01); *H04W 52/265* (2013.01); *H04W 52/281* (2013.01); *H04W 74/002* (2013.01); *H04W 88/02* (2013.01); *H04W 88/08* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/23* (2018.01); *Y02D 70/26* (2018.01)

(58) Field of Classification Search
CPC ............... H04W 52/243; H04W 76/14; H04W 74/0816; H04W 92/18; H04W 52/265; H04W 74/002; H04W 88/02; H04W 88/08; H04W 52/281; H04W 52/245; Y02D 70/21; Y02D 70/23; Y02D 70/142; Y02D 70/146; Y02D 70/1242; Y02D 70/00; Y02D 70/164; Y02D 70/26; Y02D 70/144; Y02D 70/22; Y02D 70/1262
See application file for complete search history.

(56) References Cited

U.S. PATENT DOCUMENTS

| | | | | |
|---|---|---|---|---|
| 2011/0176627 | A1* | 7/2011 | Wu | H04B 7/0452 |
| | | | | 375/260 |
| 2013/0058218 | A1* | 3/2013 | Wu | H04W 74/0816 |
| | | | | 370/241 |
| 2013/0308549 | A1* | 11/2013 | Madan | H04W 28/26 |
| | | | | 370/329 |
| 2014/0341128 | A1 | 11/2014 | Turtinen et al. | |
| 2015/0117365 | A1 | 4/2015 | Merlin et al. | |
| 2016/0037385 | A1* | 2/2016 | Boudreau | H04W 76/14 |
| | | | | 370/328 |
| 2016/0360528 | A1* | 12/2016 | Kim | H04W 74/0816 |
| 2018/0070217 | A1* | 3/2018 | Morita | H04W 76/14 |

OTHER PUBLICATIONS

Alawieh B., et al., "A Distributed Power and Rate Control Scheme for Mobile Ad hoc Networks", 6th International Symposium on Modeling and Optimization in Mobile, Ad Hoc, and Wireless Networks and Workshops, WIOPT, Apr. 1, 2008, XP031295912, ISBN: 978-963-979918-9, pp. 335-343.
International Search Report and Written Opinion—PCT/US2017/045981 —ISA/EPO—Oct. 10, 2017.
Wang S.Y., et al., "PC-CTS: A Power-Controlled-CTS MAC Scheme to Improve Spatial Reuse in Wireless Mesh Networks", IEEE Symposium on Computers and Communications, Jul. 1, 2007, XP031159795, ISBN: 978-1-4244-1520-5, pp. 290-295.
Wang W., et al., "Power Control for Distributed MAC Protocols in Wireless Ad Hoc Networks", IEEE Transactions on Mobile Computing, Oct. 1, 2008, vol. 7, No. 10, XP011335278, ISSN: 1536-1233, DOI: 10.1109/TMC.2008.40, pp. 1169-1183.

* cited by examiner

CLEAR-TO-SEND (CTS) POWER CONTROL IN SIDELINK

PRIORITY CLAIM

This application claims priority to and the benefit of Provisional Patent Application No. 62/374,557 filed in the United States Patent Office on Aug. 12, 2016 and Provisional Patent Application No. 62/374,448 filed in the United States Patent Office on Aug. 12, 2016, the entire content of which is incorporated herein by reference as if fully set forth below in its entirety and for all applicable purposes.

TECHNICAL FIELD

The technology discussed herein relates generally to wireless communication systems, and more particularly, to dynamic power control for sidelink clear-to-send channels.

INTRODUCTION

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. As the demand for mobile broadband access continues to increase, research and development continue to advance wireless communication technologies not only to meet the growing demand for mobile broadband access, but also to advance and enhance the user experience with mobile communications.

A user equipment (UE) may sometimes communicate directly with another UE without relaying such communication through a network access node, such as an evolved Node B (eNB) or an access point (AP). An example of such UE-to-UE (a.k.a., device-to-device) communication may be referred to herein as sidelink communication. In some circumstances, UE-to-UE communications may potentially interfere with eNB-to-UE communications and/or other UE-to-UE communications. Interference management in such circumstances may enhance communication efficiency and throughput, thereby improving overall user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of wireless communication. The method may be operational at a sidelink receiver device and may include receiving a ready-to-send (RTS) message in an RTS channel at a received RTS channel power, receiving a dynamic clear-to-send (CTS) transmit power scaling parameter that is different from a pre-assigned constant parameter for CTS power control stored at the sidelink receiver device, generating a CTS message responsive to the RTS message, calculating a CTS channel power as a function of at least the dynamic CTS transmit power scaling parameter and the received RTS channel power, and sending the CTS message in a CTS channel at the CTS channel power. The method may include changing the CTS channel power, relative to a power that would be obtained as a function of the pre-assigned constant parameter for CTS power control stored at the sidelink receiver device and the received RTS channel power, to dynamically increase or decrease a size of a CTS channel interference protection zone.

According to another aspect, the present disclosure may provide a method that may be operational at a scheduling device, such as an eNodeB. The method operational at the scheduling device may include, for example, sending a grant to authorize device-to-device communication among a plurality of scheduled entities, the grant allocating a clear-to-send (CTS) channel. The method may further include determining to change a size of a CTS interference protection zone of at least one scheduled entity in the plurality of scheduled entities. The method may further include determining a value of a dynamic CTS transmit power scaling parameter, wherein the dynamic CTS transmit power scaling parameter is used to change the size of the CTS interference protection zone by scaling a transmit power of the at least one scheduled entity during a CTS channel period. The method may still further include sending the dynamic CTS transmit power scaling parameter to the at least one scheduled entity.

In some implementation, a method of communication operational at a sidelink transmitter device, may include determining to change a size of a clear-to-send (CTS) interference protection zone of at least one sidelink receiver device linked in device-to-device communication to the sidelink transmitter. The method may further include determining a value of a dynamic CTS transmit power scaling parameter, wherein the dynamic CTS transmit power scaling parameter is used to change the size of the CTS interference protection zone by scaling a transmit power of the at least one sidelink receiver device during a CTS channel. The method may further include sending the dynamic CTS transmit power scaling parameter to the at least one sidelink receiver device.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
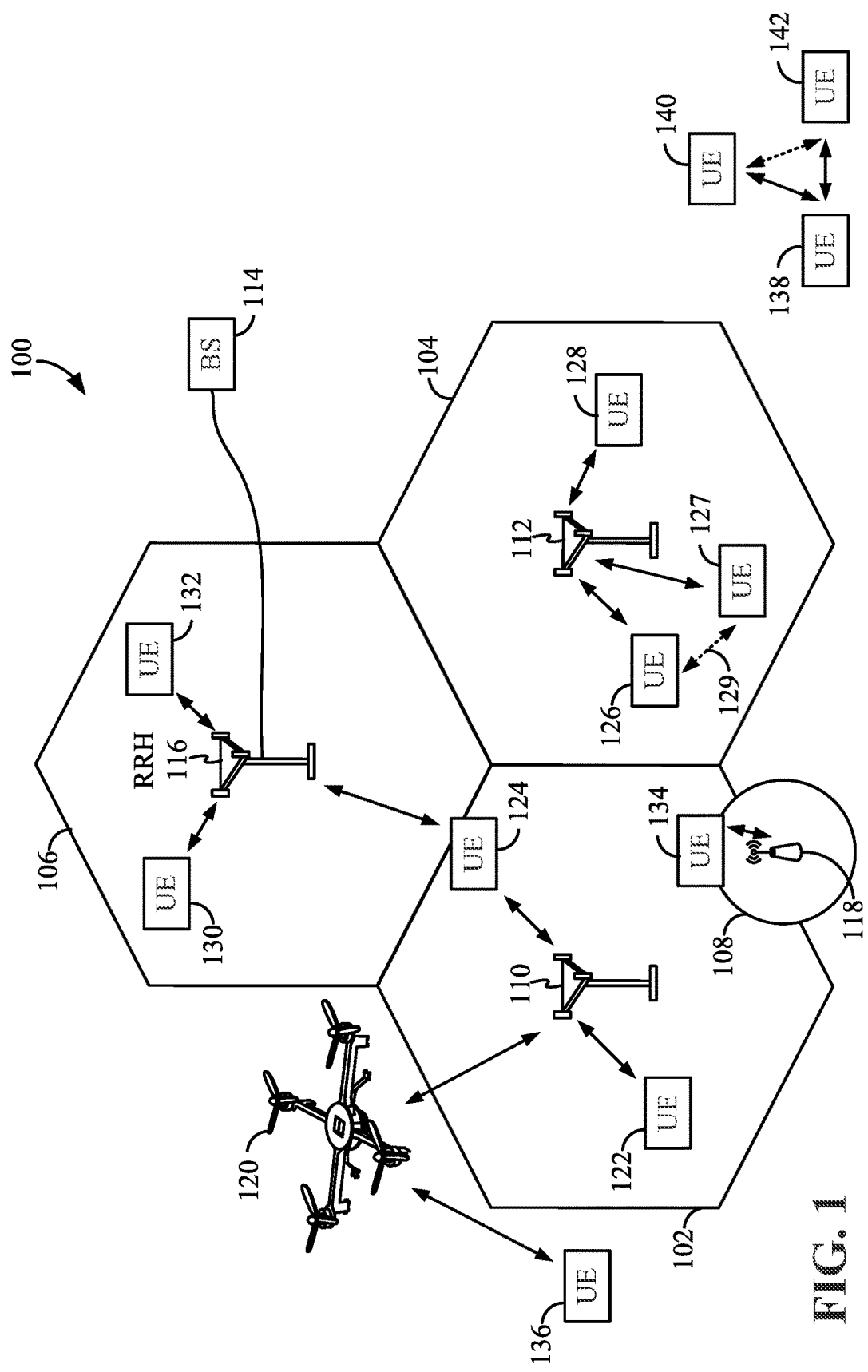
FIG. 1 is a diagram illustrating an example of an access network according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Overview

According to some aspects, an first device (e.g., a scheduling entity, an eNodeB, and/or a sidelink transmitter) may configure a second device, such as a sidelink receiver, so that an interference protection zone (e.g., a CTS channel interference protection zone) surrounding the second device may be dynamically adjusted in size based, for example, on various objectives and/or use cases recognized by the first device. The interference protection zone may be, for example, an area surrounding the second device, within which neighboring devices may be silenced. Changes to the interference protection zone may be achieved, for example, by providing the second device with a dynamic clear-to-send (CTS) transmit power scaling parameter that is different from a pre-assigned constant parameter for CTS power control stored at the second device (e.g., pre-stored at the sidelink receiver). The CTS transmit power scaling parameter may be provided to the second device by the first device. The second device may generate a CTS message responsive to a ready-to-send (RTS) message received at a received RTS channel power. The second device may calculate a CTS channel power as a function of at least the provided dynamic CTS transmit power scaling parameter (provided by the first device) and the received RTS channel power. This may be an alternative to calculating the CTS channel power using the pre-assigned constant parameter for CTS power control stored at the second device and the received RTS channel power. The second device may then send the CTS message in a CTS channel at the calculated CTS channel power. Using the provided dynamic CTS transmit power scaling parameter facilitates a dynamic variability in the size of the interference protection zone, where the size of the interference protection zone is proportional to the CTS channel power. In some examples, the change to the CTS channel power, relative to a power that would be obtained as a function of the pre-assigned constant parameter for CTS power control stored at the sidelink receiver device and the received RTS channel power, may be used to dynamically increase or decrease a size of a CTS channel interference protection zone surrounding the second device.

Thus, according to exemplary aspects described herein, one or more first devices (e.g., devices external to and/or remote from the second device) may dynamically control the size of a CTS channel interference protection zone surrounding one or more second devices (e.g., sidelink receivers) by dynamically adjusting CTS channel power of the one or more second devices (e.g., sidelink receivers).

Operational Environment

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with devices in a portion of the cell. Additionally or alternatively, the groups of antennas may use beam-forming techniques so that the group of antennas, or subsets thereof, may be responsible for communication with devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in macrocells 102 and 104; and a third high-power base station 114 is shown controlling a remote radio head (RRH) 116 in macrocell 106. In this example, the macrocells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the small cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of devices (e.g., UEs, mobile apparatuses, Internet of Things (IoT) devices, terminals).

FIG. 1 further includes a quadcopter or drone 120, which may be configured to function as a base station. That is, in some examples, a base station (and accordingly, the cell defined by the base station) may not necessarily be stationary, and the geographic area of the cell may move according to the location of a mobile base station such as the quadcopter or drone 120. In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple apparatuses, such as mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of Things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure device; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with a mobile base station, implemented, for example, as the quadcopter or drone 120. Here, each base station 110, 112, 114, 118, and 120 may be configured to provide an access point to a core network (not shown) for all the UEs in the respective cells. In another example, the quadcopter or drone 120 may be configured to function as a UE. For example, the quadcopter or drone 120 may operate within macrocell 102 by communicating with base station 110.

An air interface in the access network 100 may utilize one or more multiplexing and/or multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during communication with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell, macrocell 102, to the geographic area corresponding to a neighbor cell, macrocell 106. When the signal strength or quality from the neighbor cell, macrocell 106 exceeds that of its serving cell, macrocell 102 for a given amount of time, the UE 124 may transmit a reporting message to its serving base station 110 indicating this condition. In response, the UE 124 may receive a handover command, and the UE may undergo a handover to the neighbor cell, macrocell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, scheduled entities utilize resources allocated by the scheduling entity. In some implementations, the scheduling entity may allocate the resources for a period (e.g., a block of time) that may be referred to as transmission time interval (TTI) (or a frame, subframe, or slot).

Base stations are not the only entities that may function as a scheduling entity. That is, in some examples, a UE may function as a scheduling entity, scheduling resources for one or more scheduled entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in, for example, a peer-to-peer (P2P) network, and/or in a mesh network. In a mesh network, for example, UEs 140 and 142 may optionally communicate directly with one another in addition to communicating with the scheduling entity, depicted as UE 138. In a network that implements sidelink communication, for example, UE 126 and UE 127 may communicate directly with one another. In FIG. 1, for example, a UE 126 may unicast data to one neighboring UE (shown as UE 127) and/or broadcast data to a plurality of neighboring UEs (not shown), where the one or more neighboring UEs are situated close to (e.g., in close physical proximity, geographically nearby) the UE 126, without having to send the data via the base station 112. For example, UE 126 may directly send data to UE 127 (or vice versa) via a direct device-to-device radio link 129 (i.e., where the devices are linked in device-to-device communication), without having to transmit the data via the base station 112.

Thus, in a wireless communication network with a scheduled access to time-frequency resources and having a cellular configuration, a P2P configuration, a mesh configuration, and/or a sidelink configuration, a scheduling entity and one or more scheduled entities may communicate utilizing the scheduled resources.

Figure 2:
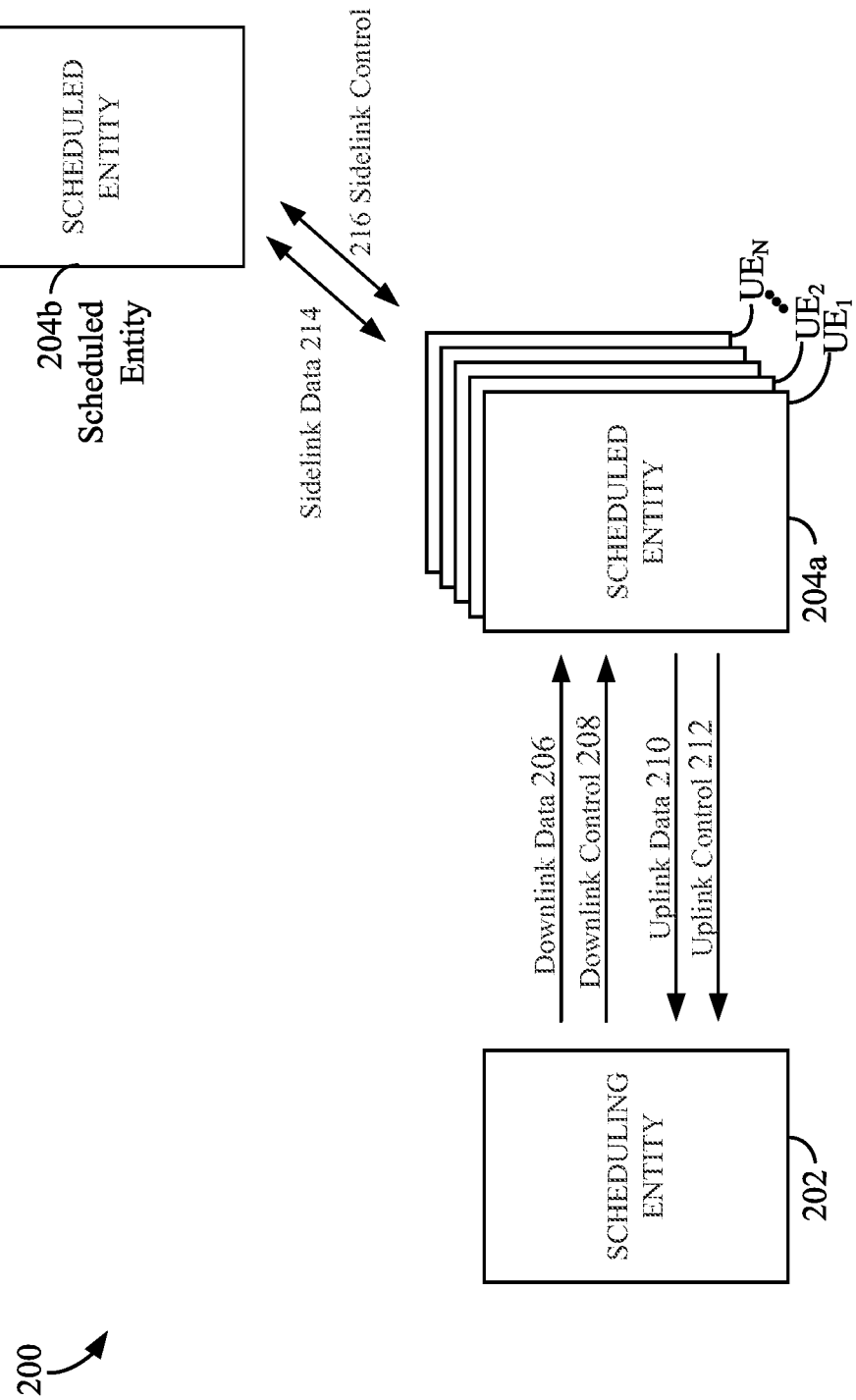
FIG. 2 is a diagram conceptually illustrating an example of a scheduling entity communicating with one or more scheduled entities according to some aspects of the present disclosure.

Referring now to FIG. 2, a block diagram 200 illustrates a scheduling entity 202 and a plurality of scheduled entities 204 (e.g., 204a and 204b). Here, the scheduling entity 202 may correspond to the base stations 110, 112, 114, and 118. In additional examples, the scheduling entity 202 may correspond to the UE 138, the UE 126, the quadcopter or drone 120, or any other suitable node in the access network 100. Similarly, in various examples, the scheduled entities 204 may correspond to the UE 122, 124, 126, 127, 128, 130, 132, 134, 136, 138, 140, and 142, or any other suitable node in the access network 100. For explanatory purposes, the scheduled entities 204 may also be referred to as UE1, UE2, UE3, . . . , UEN, where N is a positive non-zero integer.

As illustrated in FIG. 2, the scheduling entity 202 may broadcast data 206 to one or more scheduled entities 204 (the data may be referred to as downlink data). In accordance with certain aspects of the present disclosure, the term downlink may refer to a point-to-multipoint transmission and/or a point-to-point transmission originating at the scheduling entity 202. Broadly, the scheduling entity 202 is a node or device responsible for scheduling traffic in a wireless communication network, including the downlink transmissions and, in some examples, uplink data 210 from one or more scheduled entities 204 to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more scheduled entities 204. Uplink data 210 and/or downlink data 206 may be transmitted during a transmission time interval (TTI). Generally, a TTI refers to a schedulable period or interval of time that includes at least one transport block. A TTI may correspond to an encapsulated set or packet of information capable of being independently decoded. In various examples, TTIs may correspond to frames, subframes, data blocks, time slots, or other suitable groupings of bits for transmission and/or reception.

The scheduling entity 202 may broadcast control channel 208 information including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink data 210 and/or downlink data 206 including one or more data channels, such as a physical downlink shared channel (PDSCH) or a physical uplink shared channel (PUSCH) (and, in some examples, system information blocks (SIBs)), may be additionally transmitted between the scheduling entity 202 and the scheduled entity 204. Transmissions of the control and data information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink data transmissions. In some examples, the uplink control information 212 may include a scheduling request (SR), i.e., request for the scheduling entity 202 to schedule uplink transmissions. Here, in response to the SR transmitted on a control channel in the uplink control information 212, the scheduling entity 202 may transmit in the control channel 208 information that may schedule a TTI for uplink packets.

In some examples, scheduled entities such as a first scheduled entity 204a and a second scheduled entity 204b may utilize sidelink signals for direct D2D communication. Sidelink signals may include sidelink data 214 and sidelink control information 216. Sidelink control information 216 may include a request signal such as a request to send 1 (RTS1) and request to send 2 (RTS2) (also known as a source transmit signal (STS) and/or a direction selection signal (DSS)), a response signal such as a clear to send (CTS) signal (also known as a destination receive signal (DRS)), and a physical sidelink HARQ indicator channel (PSHICH). The RTS1/RTS2 (or STS/DSS) may provide for a scheduled entity 204 to request a duration of time to keep a sidelink channel available for a sidelink signal; and the CTS (or DRS) may provide for the scheduled entity 204 to indicate availability of the sidelink channel, e.g., for the requested duration of time. In other words, according to one aspect, the RTS channel provides for a first scheduled entity to request to keep a sidelink channel available for a sidelink signal for a requested duration of time, and the CTS channel provides for a second scheduled entity, in device-to-device communication with the first scheduled entity, to indicate availability of the sidelink channel for the requested duration of time. In one aspect, the exchange of RTS and CTS signals (e.g., an RTS and CTS handshake, or STS/DSS and DRS handshake) may be considered as a listen-before-talk mechanism used for flow control, whereby a first device transmits an RTS to request to reserve a channel to transmit data for a certain amount of time, and a receiving device, if it can accommodate the request, sends a CTS to indicate that it can accommodate the request. An exchange of RTS and CTS (or STS/DSS and DRS) signals (e.g., handshake) may enable different scheduled entities performing sidelink communications (e.g., device-to-device communications) to negotiate the availability of the sidelink channel prior to communication of the sidelink data 214 information. The PSHICH may include HARQ acknowledgment information and/or a HARQ indicator from a destination device, so that the destination may acknowledge data received from a source device.

The channels illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other data, control, and feedback channels.

Figure 3:
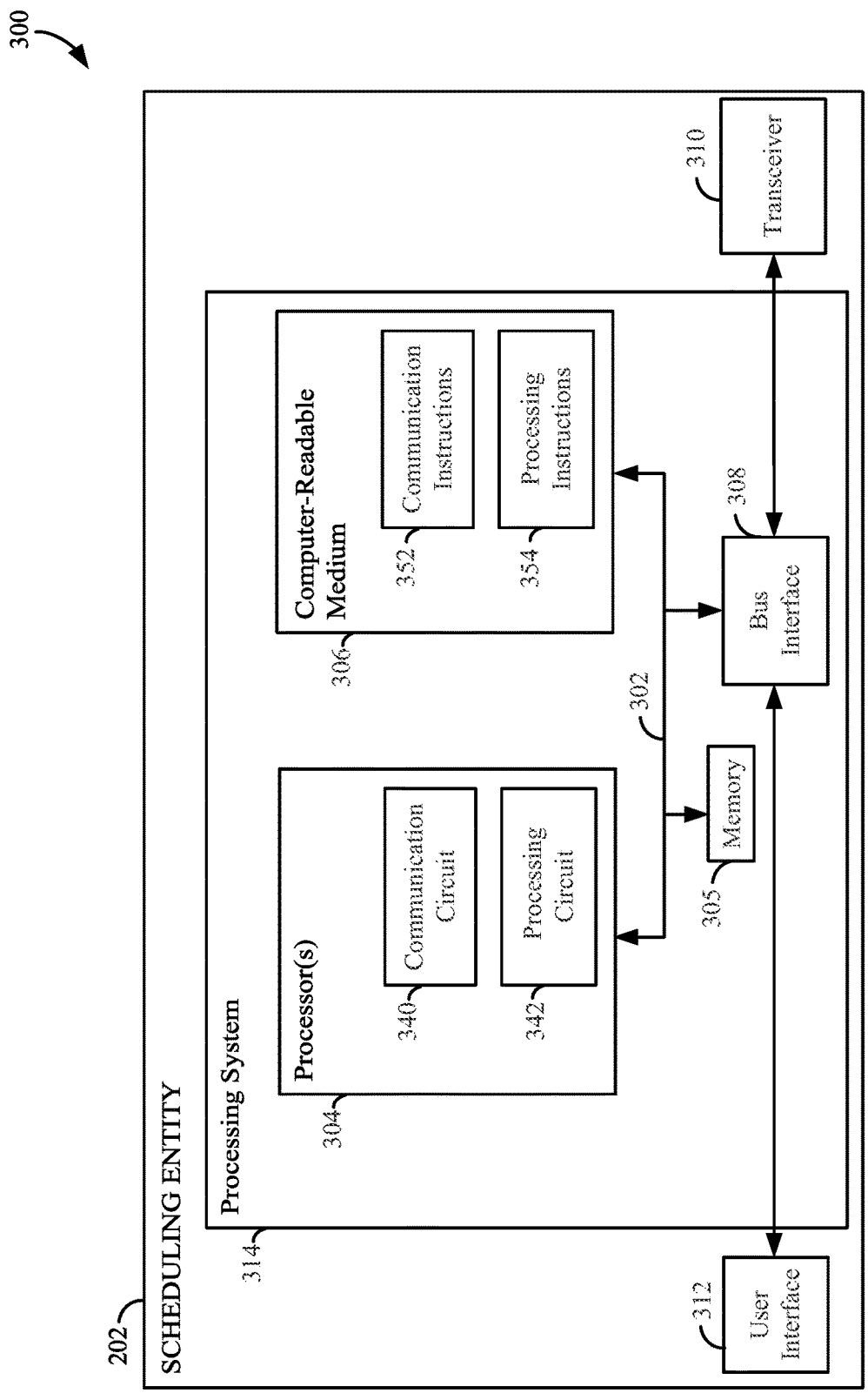
FIG. 3 is a diagram illustrating an example of a hardware implementation for a scheduling entity according to some aspects of the present disclosure.

FIG. 3 is a diagram 300 illustrating an example of a hardware implementation for scheduling entity 202 according to aspects of the present disclosure. The scheduling entity 202 may employ a processing system 314. For example, the scheduling entity 202 may be a user equipment (UE) as illustrated in any one or more of FIGS. 1, 2, 9, 10, and/or 11. In another example, the scheduling entity 202 may be a base station as illustrated in FIG. 1.

The scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used to implement any one or more of the processes described herein, for example, in FIGS. 12-14.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include a communication circuit 340. The communication circuit 340 may include one or more hardware components that provide the physical structure that performs various processes related to wireless communication (e.g., signal reception and/or signal transmission) as described herein. In some aspects of the disclosure, the processor 304 may also include a processing circuit 342. The processing circuit 342 may include one or more hardware components that provide the physical structure that performs various processes related to signal processing (e.g., processing a received signal and/or processing a signal for transmission) as described herein. The circuitry included in the processor 304 is provided as non-limiting examples. Other means for carrying out the described functions exists and is included within various aspects of the present disclosure.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software. In some aspects of the disclosure, the computer-readable medium 306 may include communication instructions 352. The communication instructions 352 may include instructions for performing various operations related to wireless communication (e.g., signal reception and/or signal transmission) as described herein. In some aspects of the disclosure, the computer-readable medium 306 may include processing instructions 354. The processing instructions 354 may include instructions for performing various operations related to signal processing (e.g., processing a received signal and/or processing a signal for transmission) as described herein.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable medium 306 may include communication instructions 352. The communication instructions 352 may include instructions for performing various operations related to wireless communication (e.g., signal reception and/or signal transmission) as described herein. In some aspects of the disclosure, the computer-readable medium 306 may include processing instructions 354. The processing instructions 354 may include instructions for performing various operations related to signal processing (e.g., processing a received signal and/or processing a signal for transmission) as described herein. The instructions included in the computer-readable medium 306 are provided as non-limiting examples. Other instructions configured to carry out the described functions exist and are included within various aspects of the present disclosure. In general, the scheduling entity may be considered to be, for example, an apparatus for wireless communication, comprising, for example, a processor, a transceiver communicatively coupled to the processor, and a memory communicatively coupled to the processor, wherein the memory stores instructions that when executed by the processor cause the processor to be configured to carry out the described functions that exist and are included within various aspects of the present disclosure.

Figure 4:
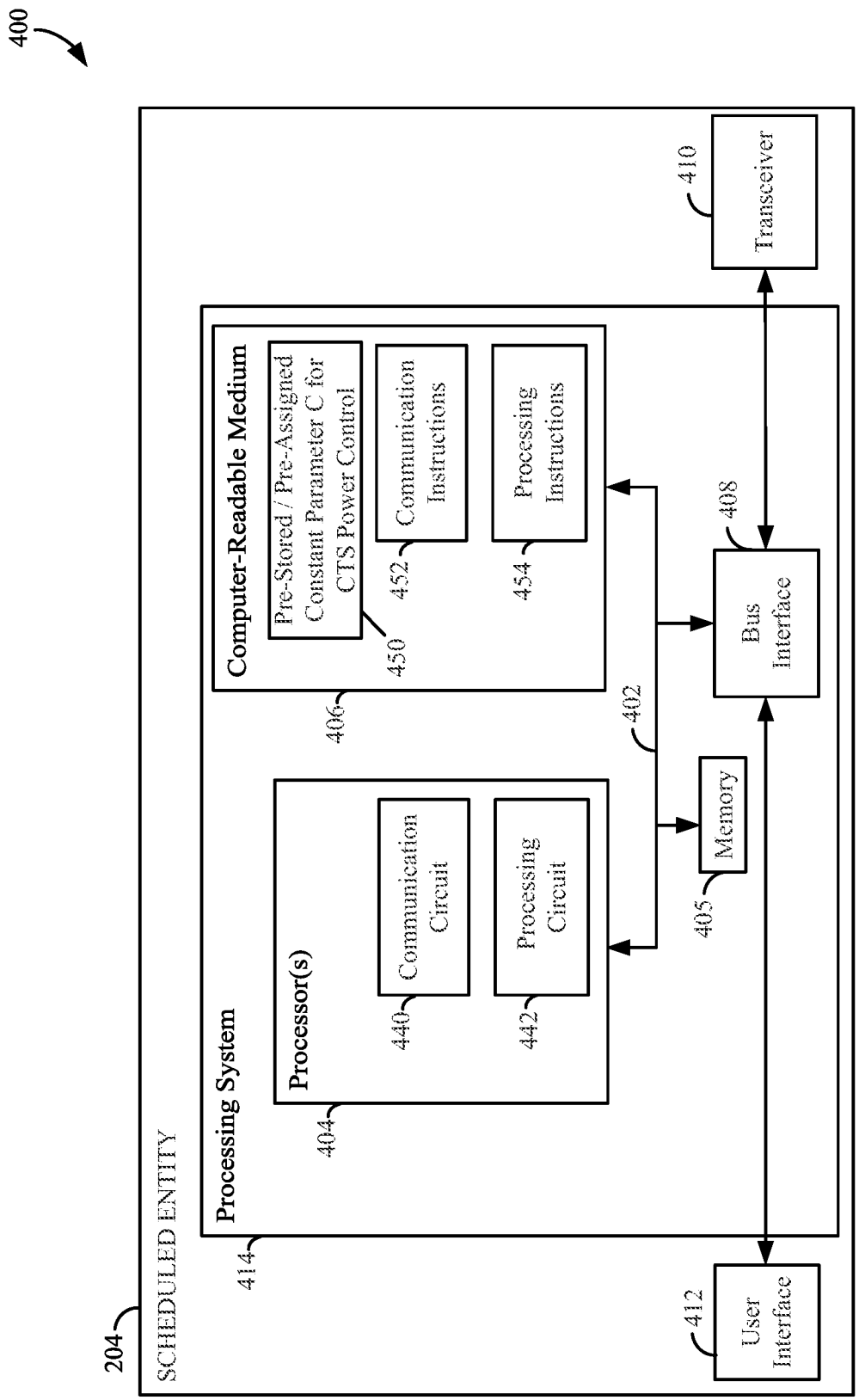
FIG. 4 is a diagram illustrating an example of a hardware implementation for a scheduled entity according to some aspects of the present disclosure.

FIG. 4 is a diagram 400 illustrating an example of a hardware implementation for a scheduled entity 204 according to aspects of the present disclosure. The scheduled entity 204 may employ a processing system 414. Scheduled entity 204 may be implemented with a processing system 414 that includes one or more processors 404. For example, the scheduled entity 204 may be a user equipment (UE) as illustrated in any one or more of FIGS. 1, 2, 9, 10, and/or 11.

Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, scheduled entity 204 may be configured to perform any one or more of the functions described herein. That is, the processor 404, as utilized in scheduled entity 204, may be used to implement any one or more of the processes described herein, such as those processes disclosed in FIGS. 12-14.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a means for communicating with various other apparatus over a transmission medium. Depending upon the nature of the apparatus, a user interface 412 (e.g., keypad, display, speaker, microphone, joystick) may also be provided.

In some aspects of the disclosure, at least one processor 404 may include a communication circuit 440. The communication circuit 440 may include one or more hardware components that provide the physical structure that performs various processes related to wireless communication (e.g., signal reception and/or signal transmission) as described herein. In some aspects of the disclosure, the processor 404 may also include a processing circuit 442. The processing circuit 442 may include one or more hardware components that provide the physical structure that performs various processes related to signal processing (e.g., processing a received signal and/or processing a signal for transmission) as described herein. The circuitry included in the processor 404 is provided as non-limiting examples. Other means for carrying out the described functions exists and is included within various aspects of the present disclosure. In some aspects of the disclosure, the computer-readable medium 406 may store computer-executable code including instructions configured to perform various processes described herein. The instructions included in the computer-readable medium 406 are provided as non-limiting examples. Other instructions configured to carry out the described functions exist and are included within various aspects of the present disclosure.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software. In some aspects of the disclosure, the computer-readable medium 406 may include a pre-stored or pre-assigned constant, C, for clear-to-send (CTS) power control 450. The pre-stored or pre-assigned constant, C, for CTS power control 450 may be stored in the computer-readable medium 406, for example, by a manufacturer of the scheduled entity 204. The pre-stored or pre-assigned constant, C, for CTS power control 450 may be used in sidelink communications as described herein. In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include processing instructions 454. The processing instructions 454 may include instructions for performing various operations related to signal processing (e.g., processing a received signal and/or processing a signal for transmission) as described herein.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the computer-readable medium 406 may include processing instructions 454. The processing instructions 454 may include instructions for performing various operations related to signal processing (e.g., processing a received signal and/or processing a signal for transmission) as described herein. The instructions included in the computer-readable medium 406 are provided as non-limiting examples. Other instructions configured to carry out the described functions exist and are included within various aspects of the present disclosure. In general, the scheduled entity may be considered to be, for example, an apparatus for wireless communication, comprising, for example, a processor, a transceiver communicatively coupled to the processor, and a memory communicatively coupled to the processor, wherein the memory stores instructions that when executed by the processor cause the processor to be configured to carry out the described functions that exist and are included within various aspects of the present disclosure.

Subframe Structure

FIGS. 5-8 and 15 are schematic diagrams that illustrate the structure of various subframe formats according to a variety of aspects of this disclosure. As illustrated in each of these illustrations, the horizontal dimension represents time, and the vertical dimension represents frequency. Neither of these dimensions is intended to be accurate to scale, and are merely utilized as a scheme to illustrate characteristics of different waveforms over time as they may be configured in respective examples and embodiments. Below are provided descriptions of exemplary channels (e.g., allocations of time and frequency) that can be allocated to a TTI, in terms of exemplary content of various subframes, including a downlink-centric (DL-centric) subframe, an uplink-centric (UL-centric) subframe, and a sidelink-centric subframe.

Figure 5:
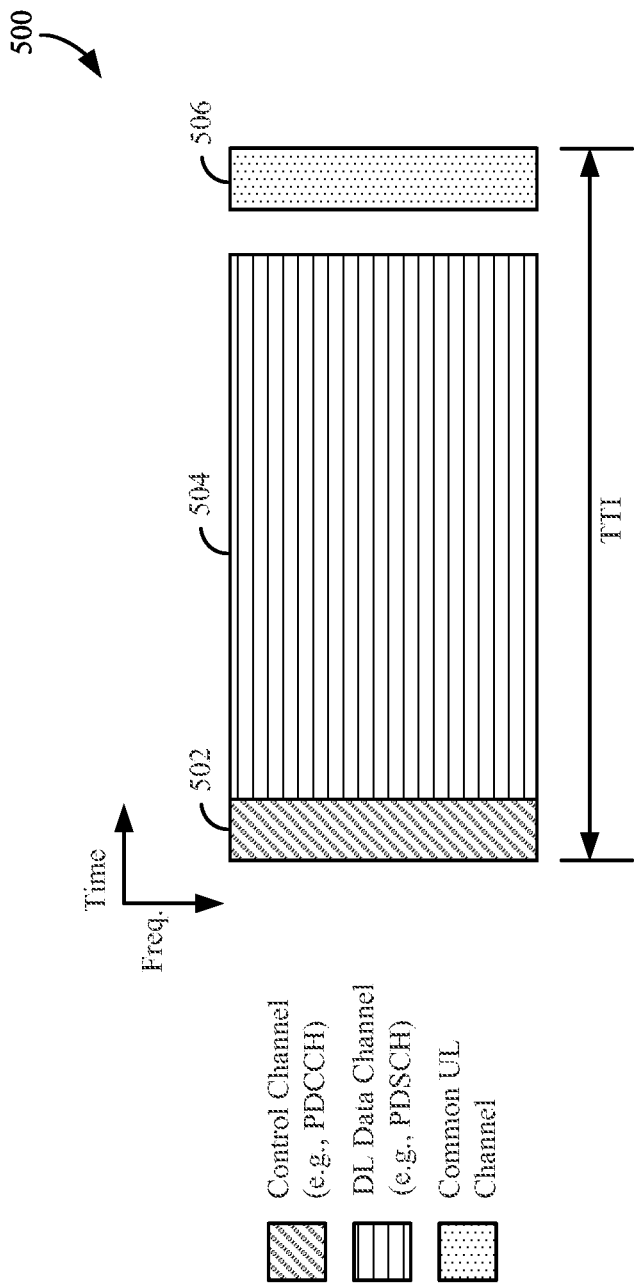
FIG. 5 is a diagram illustrating an example of a downlink (DL)-centric subframe according to some aspects of the present disclosure.

FIG. 5 is a diagram 500 showing an example of a DL-centric subframe according to some aspects of the present disclosure. The DL-centric subframe may include a control channel 502. The control channel 502 may exist in the initial or beginning portion of the DL-centric subframe. The control channel 502 may include various scheduling information and/or control information corresponding to various channels of the DL-centric subframe. In some configurations, the control channel 502 may be a physical DL control channel (PDCCH), as indicated in FIG. 5. Additional description related to the PDCCH is provided further below with reference to various other figures. The DL-centric subframe may also include a DL data channel 504. The data included in the DL data channel 504 may sometimes be referred to as the payload of the DL-centric subframe. The DL data channel 504 may include the communication resources utilized to communicate DL data from the scheduling entity 202 (e.g., eNB, sidelink transmitter) to the scheduled entity 204 (e.g., UE, sidelink receiver). In some configurations, the DL data channel 504 may be a physical DL shared channel (PDSCH).

The DL-centric subframe may also include a common UL channel 506. The common UL channel 506 may sometimes be referred to as an UL burst, a common UL burst, a common UL burst channel, and/or various other suitable terms. The common UL channel 506 may include feedback information corresponding to various other channels of the DL-centric subframe. For example, the common UL channel 506 may include feedback information corresponding to the control channel 502. Non-limiting examples of feedback information may include an ACK signal, a NACK signal, a HARQ indicator, and/or various other suitable types of information. The common UL channel 506 may include additional or alternative information, such as information pertaining to random access channel (RACH) procedures, scheduling requests (SRs), and various other suitable types of information. As illustrated in FIG. 5, the end of the DL data channel 504 may be separated in time from the beginning of the common UL channel 506. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric subframe and alternative structures having similar features may exist without necessarily deviating from the aspects described herein.

Figure 6:
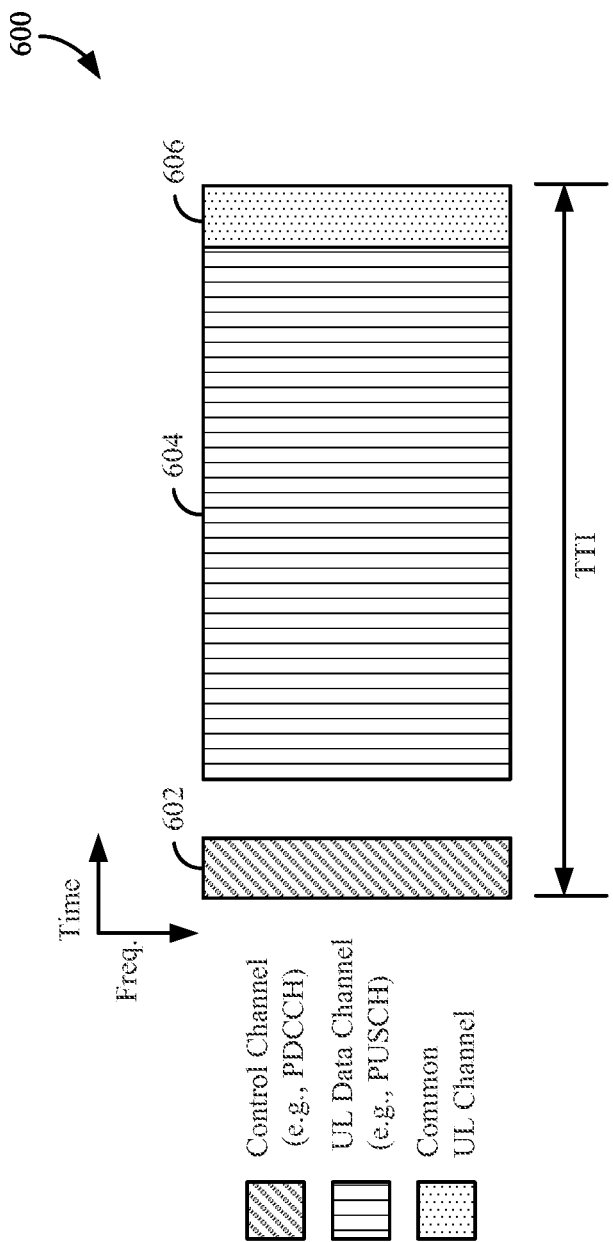
FIG. 6 is a diagram illustrating an example of an uplink (UL)-centric subframe according to some aspects of the present disclosure.

FIG. 6 is a diagram 600 showing an example of an UL-centric subframe according to some aspects of the present disclosure. The UL-centric subframe may include a control channel 602. The control channel 602 may exist in the initial or beginning portion of the UL-centric subframe. The control channel 602 in FIG. 6 may be similar to the control channel 502 described above with reference to FIG. 5. The control channel 602 may be a PDCCH. The UL-centric subframe may also include an UL data channel 604. The data included in the UL data channel 604 may sometimes be referred to as the payload of the UL-centric subframe. The UL portion may refer to the communication resources utilized to communicate UL data from the scheduled entity 204 (e.g., UE) to the scheduling entity 202 (e.g., eNB). In some configurations, the UL data channel 604 may be a physical UL shared channel (PUSCH). As illustrated in FIG. 6, the end of the control channel 602 may be separated in time from the beginning of the UL data channel 604. This time separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric subframe may also include a common UL channel 606. The common UL channel 606 in FIG. 6 may be similar to the common UL channel 506 described above with reference to FIG. 5. The common UL channel 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

Sidelink

In some circumstances, two or more scheduled entities 204 (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, Internet of Things (IoT) communications, mission-critical mesh, and/or various other suitable applications. Generally, a sidelink signal may refer to a signal communicated from one scheduled entity 204 (e.g., UE1) to another scheduled entity 204 (e.g., UE2) without relaying that signal through the scheduling entity 202 (e.g., eNB), even though the scheduling entity 202 (e.g., eNB) may be utilized for scheduling and/or control purposes. In some examples, sidelink signals may be communicated using a licensed spectrum (unlike wireless local area networks, which typically use an unlicensed spectrum).

However, sidelink signals may increase the relative likelihood of signal interference in certain circumstances. For example, interference may occur between the sidelink signals and the DL/UL control/scheduling information of nominal traffic. As another example, interference may occur between sidelink signals originating from different scheduled entities 204 (e.g., $UE_1$, $UE_2$, . . . , $UE_N$). That is, concurrently transmitted sidelink signals may collide and/or interfere with each other. Aspects of the present disclosure provide for a sidelink-centric subframe that enables signal interference management.

As explained herein, dynamic power control for sidelink data transmission may facilitate sidelink signal interference management using information received in a sidelink-centric subframe. Power control for sidelink data transmission may be achieved for each predesignated period (e.g., TTI, frame, subframe, slot) within which sidelink data is transmitted. Sidelink data transmission power may be set/adjusted/changed prior to sending sidelink data in a predesignated period, based on, for example, channel quality information received by the sidelink transmitter (e.g., a device sending an RTS) from a sidelink receiver (e.g., a device sending a CTS) before the sidelink transmitter sends the sidelink data to the sidelink receiver.

Figure 7:
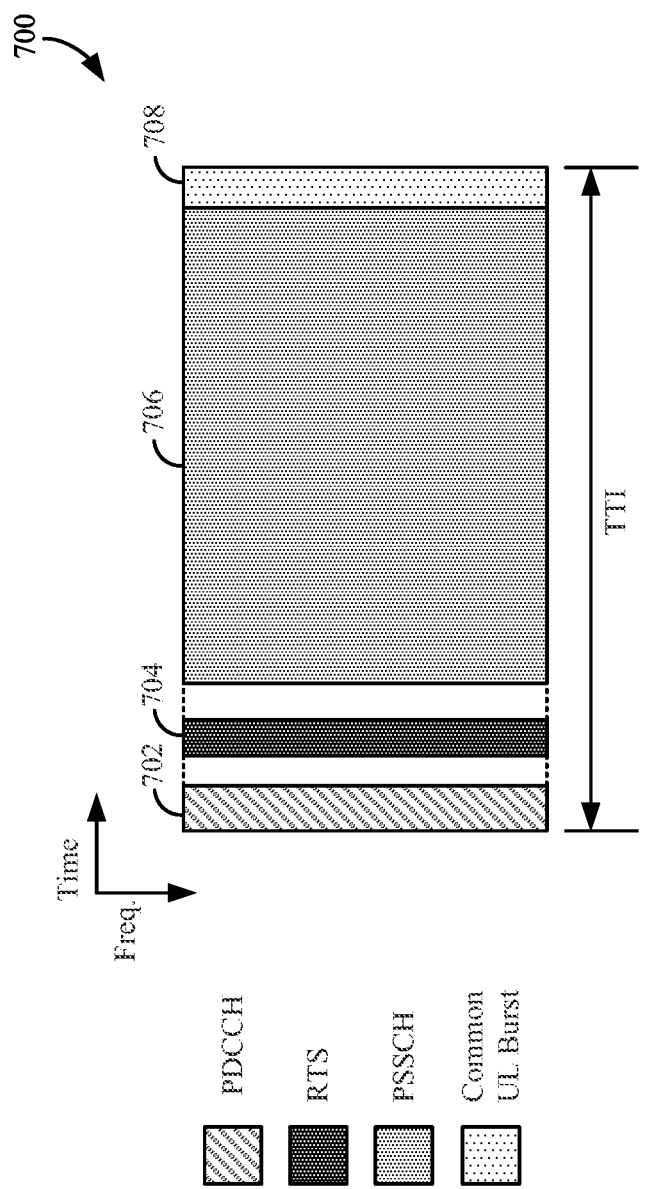
FIG. 7 is a diagram illustrating an example of a sidelink-centric subframe according to some aspects of the present disclosure.
Figure 8:
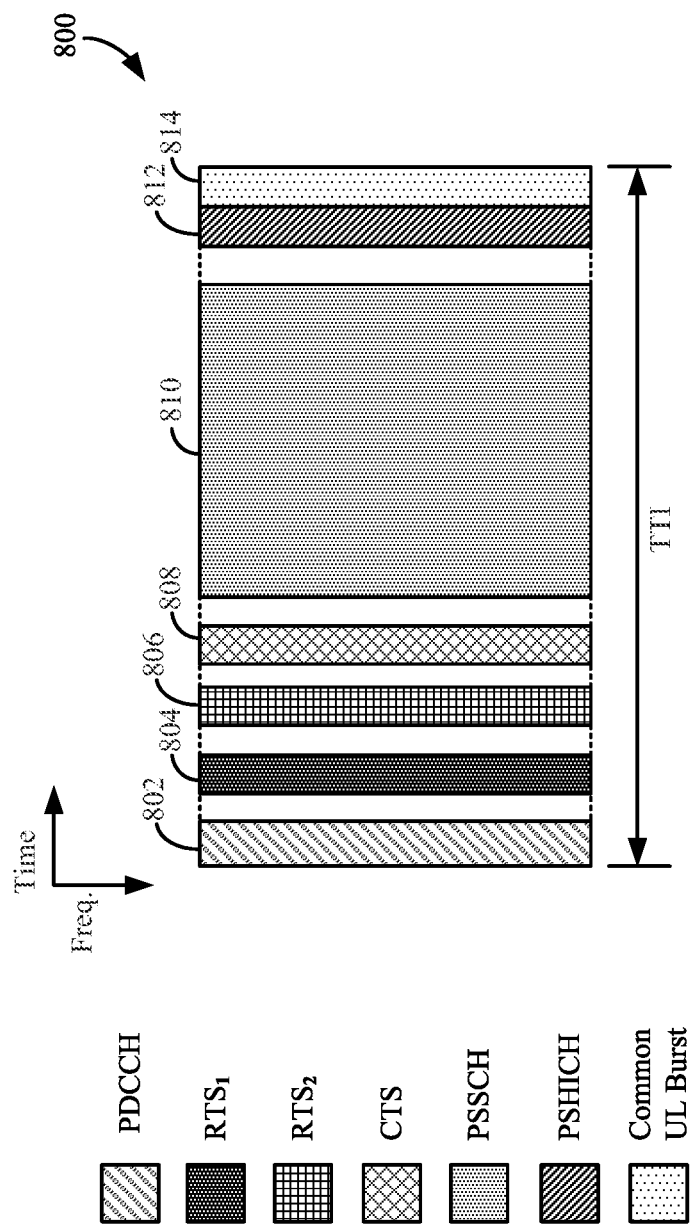
FIG. 8 is a diagram illustrating another example of a sidelink-centric subframe according to some aspects of the present disclosure.

In general, two types of sidelink-centric subframes may be realized: a sidelink-centric subframe that may be realized for broadcast communication (exemplified by FIG. 7) and a sidelink-centric subframe may be realized for unicast communication (exemplified by FIG. 8). In a broadcast situation (e.g., a point-to-multipoint communication), a sidelink transmitter may send an RTS to a plurality of sidelink receivers, but may not receive channel quality information, or even a CTS, from the plurality of sidelink receivers before the sidelink transmitter broadcasts (e.g., transmits, sends) sidelink data to the plurality of sidelink receivers. In a unicast situation (e.g., a point-to-point communication), a sidelink transmitter may send an RTS to one sidelink receiver, and may receive channel quality information from the one sidelink receiver (e.g., in a CTS) before the sidelink transmitter broadcasts sidelink data to the one sidelink receiver. Although the features described herein may be described in the context of unicast sidelink-centric subframes, nothing herein is intended to limit the scope of the disclosure to such a context. Accordingly, for completeness of the disclosure, descriptions of exemplary broadcast and unicast sidelink-centric subframes are provided herein.

Broadcast Sidelink Subframe

FIG. 7 is a diagram 700 illustrating an example of a sidelink-centric subframe according to some aspects of the present disclosure. In some configurations, this sidelink-centric subframe may be utilized for broadcast communication. A broadcast communication may refer to a transmission by one scheduled entity 204 (e.g., $UE_1$) to a group of scheduled entities 204 (e.g., $UE_2$-$UE_N$). In this example, the sidelink-centric subframe includes a control channel 702, which may be a PDCCH. In some aspects, the control channel 702 may be similar to the control channel 502 (e.g., PDCCH) described in greater detail above with reference to FIG. 5. Additionally or alternatively, the control channel 702 may include grant information related to the sidelink signal or sidelink communication. Non-limiting examples of grant information may include generic grant information and link-specific grant information. Link-specific grant information may refer to information that enables a specific sidelink communication to occur between two particular scheduled entities 204 (e.g., UEs). In comparison, generic grant information may refer to information that generally enables sidelink communications to occur within a particular cell, without specifying a particular sidelink communication. It is noted that the control channel 702 may use frequency division multiplexing (FDM) to multiplex one or more sidelinks in addition to one or more nominal uplinks (e.g., an uplink from a UE to an eNB) within a single TTI, frame, subframe, predetermined period.

As illustrated in FIG. 7, the control channel 702 may be included in the beginning or initial portion of the sidelink-centric subframe. By including the control channel 702 in the beginning or initial portion of the sidelink-centric subframe, the likelihood of interfering with the control channels 502, 602 of DL-centric and UL-centric subframes of nominal traffic is minimized. In other words, because the DL-centric subframe, the UL-centric subframe, and the sidelink-centric subframe have their DL control information communicated during a common portion of their respective subframes, the likelihood of interference between the DL control information and the sidelink signals is minimized.

The sidelink-centric subframe may also include a request-to-send (sometimes referred to as ready-to-send) (RTS) channel 704. The RTS channel 704 may refer to a portion of the subframe during which a scheduled entity 204 (e.g., $UE_1$), communicates an RTS signal (indicating, for example, a requested duration of time to keep a sidelink channel available for a sidelink signal) to other scheduled entities (e.g., $UE_2$-$UE_N$, or a subset thereof). One of ordinary skill in the art will understand that the RTS signal may include additional or alternative various information without necessarily deviating from the scope of the present disclosure. In some configurations, the RTS signal may include a group destination identifier (ID). The group destination ID may correspond to a group of devices (e.g., $UE_2$-$UE_N$, or a subset thereof) that are intended to receive the RTS signal. In some configurations, the RTS signal may, for example, indicate a duration of the sidelink transmission. In some configurations, the RTS signal may, for example, include a reference signal (RS) to enable channel estimation and RX-yielding, a modulation and coding scheme (MCS) indicator and/or various other information.

The sidelink-centric subframe may also include a sidelink data channel 706. The data included in the sidelink data channel 706 may sometimes be referred to as the payload or sidelink-burst of the sidelink-centric subframe. The sidelink data channel 706 may include the communication resources utilized to communicate sidelink data from one scheduled entity 204 (e.g., $UE_1$) to one or more other scheduled entities 204 (e.g., $UE_2$, $UE_3$). In some configurations, the sidelink data channel 706 may be a physical sidelink shared channel (PSSCH), as indicated in FIG. 7.

The sidelink-centric subframe may also include a common UL channel 708. In some aspects, the common UL channel 708 may be similar to the common UL channel 506, 606 described above with reference to FIGS. 5-6. Notably, as illustrated in FIG. 7, the common UL channel 708 may be included in the end portion of the sidelink-centric subframe. By including the common UL channel 708 in the end portion of the sidelink-centric subframe, the likelihood of interfering with the common UL channel 506, 606 of DL-centric and UL-centric subframes of nominal traffic is minimized. In other words, because the DL-centric subframe, the UL-centric subframe, and the sidelink-centric subframe have their common UL channel 506, 606, 708 communicated during a similar portion of their respective subframe, the likelihood of interference between those common UL channels 506, 606, 708 is minimized.

Unicast Sidelink Subframe

FIG. 8 is a diagram 800 illustrating another example of a sidelink-centric subframe according to some aspects of the present disclosure. In some configurations, this sidelink-centric subframe may be utilized for a unicast communication. A unicast sidelink or unicast communication may refer to a transmission between two devices, such as between a first scheduled entity 204 (e.g., first device, $UE_1$, UE 126) and a particular second scheduled entity 204 (e.g., second device, $UE_2$, UE 127). For purposes of handshaking, one device may be defined (e.g., designated) as a primary device, while the other device may be defined as a secondary device. The primary device may have priority for sidelink access. A sidelink-centric subframe for unicast may include a control channel 802 (e.g., a physical downlink control channel (PDCCH)), a first ready-to-send channel ($RTS_1$ 804), a second ready-to-send channel ($RTS_2$ 806), a clear-to-send (CTS) channel 808, a sidelink data channel 810 (e.g., physical sidelink shared channel (PSSCH)), a physical sidelink HARQ indicator channel (PSHICH) 812, and a common uplink channel 814. Description corresponding to aspects of the control channel 802, sidelink data channel 810, and common uplink channel 814 are provided above with reference to FIG. 7 and therefore will not be repeated to avoid redundancy.

The example of the sidelink-centric subframe illustrated in FIG. 8 includes two RTS channels (e.g., $RTS_1$ 804, $RTS_2$ 806). Additional description regarding the RTS signal is provided above (e.g., with reference to FIG. 7) and therefore will not be repeated to avoid redundancy. However, in contrast to the RTS signal described above with respect to FIG. 7, the RTS signal(s) described herein with reference to FIG. 8 may include a destination ID instead of a group destination ID. The destination ID may indicate the specific device/apparatus/UE destined to receive the RTS signal(s). For purposes of handshaking, a primary device and a non-primary (e.g., secondary) device may be designated.

A primary device may transmit an RTS signal during $RTS_1$ 804, and a non-primary device may transmit an RTS signal during $RTS_2$ 806. A primary device may refer to a device that has priority access to the sidelink channel During an association phase, one device may be selected as the primary device and another device may be selected as the non-primary (e.g., secondary) device. In some configurations, the primary device may be a relay device that relays a signal from a non-relay device to another device, such as a scheduling entity 202 (e.g., eNB). The relay device may experience relatively less path loss (when communicating with the scheduling entity 202 (e.g., eNB)) relative to the path loss experienced by the non-relay device.

During $RTS_1$ 804, the primary device transmits an RTS signal, and the non-primary device listens for the RTS signal from a primary device. One the one hand, if the non-primary device detects an RTS signal during $RTS_1$ 804 (i.e., in the $RTS_1$ 804 channel), then the non-primary device will not transmit an RTS signal during $RTS_2$ 806 (i.e., in the $RTS_2$ 806 channel). On the other hand, if the non-primary device does not detect an RTS signal during $RTS_1$ 804, then the non-primary device may transmit an RTS signal during $RTS_2$ 806. A time gap (e.g., guard interval, etc.) between $RTS_1$ 804 and $RTS_2$ 806 may allow the non-primary device to transition from a listening/receiving state (during $RTS_1$ 804) to a transmitting state (during $RTS_2$ 806).

A device (e.g., a primary device, a secondary device) that receives the RTS signal may communicate a clear-to-send (CTS) signal in the CTS channel 808. The CTS signal may indicate availability of the sidelink channel, for example, for a requested duration of time. The CTS signal may additionally or alternatively include other information, such as a source ID, a duration of the transmission, a signal to interference plus noise ratio (SINR) (e.g., of the received reference signal (RS) from the source device), an RS to enable TX-yielding, CQI information (e.g., based on the power of an RS in the RTS channel), and/or various other suitable types of information.

The exchange of RTS and CTS signals (i.e., the handshake between scheduled entities 204 (e.g., $UE_1$ and $UE_2$) may enable the scheduled entities performing the sidelink communications to negotiate the availability of the sidelink channel prior to the communication of the sidelink data, may facilitate a dynamic variability in a size of a CTS interference protection zone through use of a dynamic CTS transmit power scaling parameter, and may facilitate dynamic power control for sidelink data transmission on a TTI-by-TTI basis (or on a frame-by-frame, subframe-by-subframe, or slot-byslot basis). Dynamic power control for sidelink data transmission on a TTI-by-TTI basis may facilitate reduction of overall interference power in geographic areas served by the sidelink communications. The dynamic CTS transmit power scaling parameter may be re-determined and sent to the scheduled entity on a TTI-by-TTI basis.

As described in greater detail above, the sidelink data may be communicated in the sidelink data channel 810 of the sidelink-centric subframe. In some configurations, the power level of the sidelink signal communicated in the sidelink data channel 810 may be dynamically determined/ selected/adjusted based on CQI information included in the CTS signal received in the CTS channel 808 prior to sending the data in the sidelink data channel 810. Additionally or alternatively, in some configurations, the MCS of the sidelink signal communicated in the sidelink data channel 810 may be dynamically determined/selected/adjusted based on CQI information included in the CTS signal received in the CTS channel 808 prior to sending the data in the sidelink data channel 810.

After communicating the sidelink data in the sidelink data channel 810, acknowledgement information may be communicated between the scheduled entities 204 (e.g., UEs). Such acknowledgement information may be communicated in the PSHICH 812 (also referred to as the sidelink acknowledgement channel) of the sidelink-centric subframe. Non-limiting examples of such acknowledgement information may include an ACK signal, a NACK signal, a HARQ indicator, and/or various other suitable types of acknowledgement information. For example, after receiving and successfully decoding sidelink data from $UE_1$ in the sidelink data channel 810, $UE_2$ may transmit an ACK signal to the $UE_1$ in the PSHICH 812 of the sidelink-centric subframe.

RX-Yielding and TX-Yielding

Figure 9:
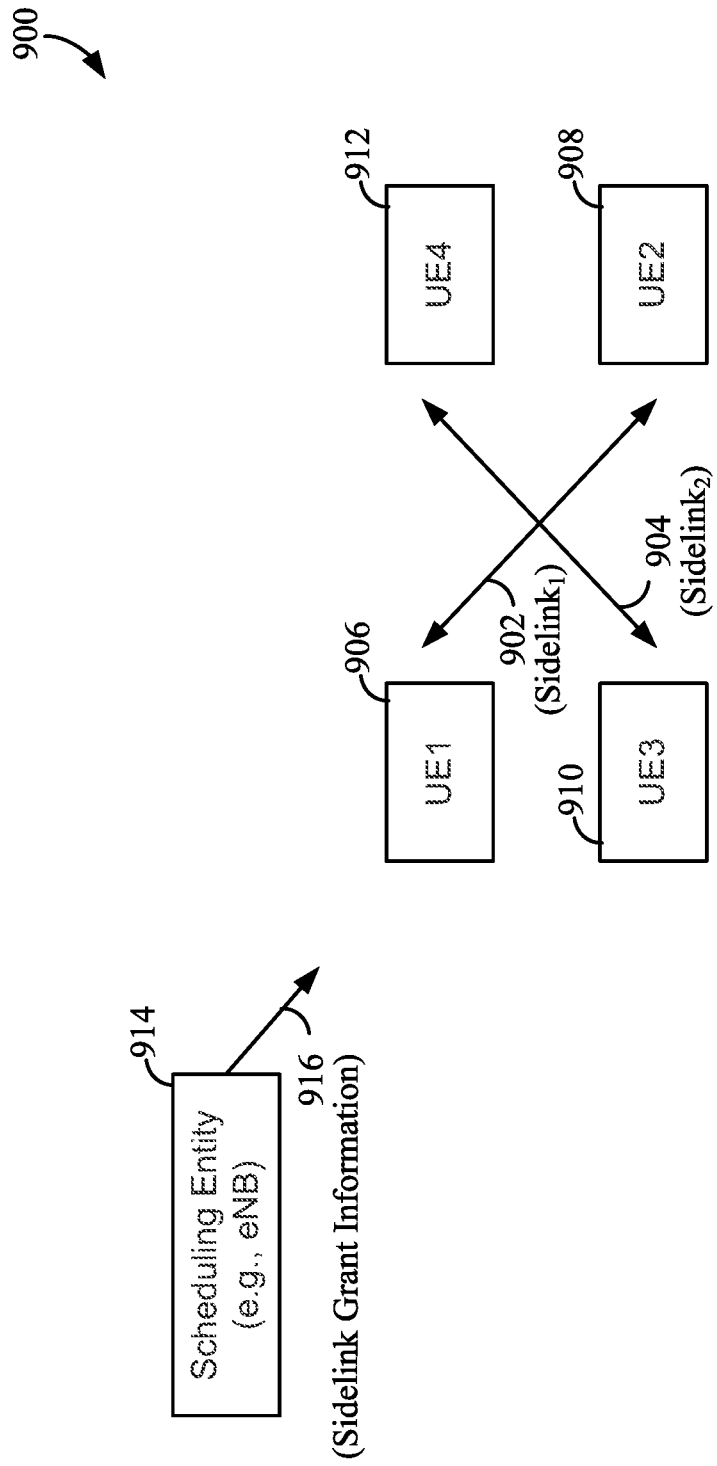
FIG. 9 is a block diagram providing an exemplary illustration to facilitate understanding of receiver yielding (also referred to as RX-yielding) and transmitter yielding (also referred to as TX-yielding) according to some aspects of the present disclosure.

FIG. 9 is a block diagram 900 providing an exemplary illustration to facilitate an understanding of receiver yielding (also referred to as RX-yielding) and transmitter yielding (also referred to as TX-yielding) according to some aspects of the present disclosure. In connection with the following explanation, assume that two sidelinks exist. $Sidelink_1$ 902 is between UE1 906 and UE2 908. $Sidelink_2$ 904 is between $UE_3$ 910 and $UE_4$ 912. Assume also that $Sidelink_1$ 902 has a higher priority than $Sidelink_2$ 904.

In the exemplary scenario of FIG. 9, a scheduling entity 914 (e.g., an eNB) may send sidelink grant information 916 via a control channel (e.g., control channel 802). The sidelink grant information 916 may indicate that sidelink communication between scheduled neighboring devices (e.g., UE1 906, UE2 908, UE3 910, UE4 912) may be authorized for a predetermined period (e.g., a TTI, a frame, a sub-frame, a slot, or multiples thereof).

In an exemplary scenario of RX-yielding, if UE1 906 and UE3 910 concurrently transmit RTS signals in an RTS channel (e.g., $RTS_1$ 804), UE4 912 will refrain from transmitting a CTS signal in a CTS channel 808 because $Sidelink_1$ 902 has a relatively higher priority than $Sidelink_2$ 904. Accordingly, the relatively lower priority sidelink, $Sidelink_2$ 904, yields communication of the CTS signal in the CTS channel 808 from sidelink receiver UE4 912 to sidelink receiver UE2 908 under this RX-yielding scenario. In other words, sidelink receiver UE4 912 yields the CTS channel 808 to sidelink receiver UE2 908.

In an exemplary scenario of TX-yielding, if UE1 906 and UE3 910 concurrently transmit RTS signals in the RTS channel ($RTS_1$ 804), UE2 will transmit a CTS signal in the CTS channel 808 because $Sidelink_1$ 906 has a relatively higher priority than $Sidelink_2$ 904. In the CTS signal, UE2 may include, among other things, a reference signal (RS) that is configured to inform UE3 910 that UE3 910 will interfere with sidelink communication (e.g., interfere with transmission of data in the sidelink data channel 810) if UE3 910 transmits sidelink data during the current predetermined period allocated for sidelink communication (e.g., the current TTI, frame, sub-frame, slot, or allocated multiples thereof). Accordingly, by receiving this RS (in the CTS signal sent from UE2), UE3 910, which is a sidelink transmitter, will refrain from transmitting sidelink data during the current predetermined period allocated for sidelink communication. Accordingly, the relatively lower priority sidelink, $Sidelink_2$ 904, yields communication of the sidelink data in sidelink data channel 810 from sidelink transmitter UE3 910 to sidelink transmitter UE1 906 under this TX-yielding scenario. In other words, sidelink transmitter UE3 910 yields the sidelink data channel 810 to sidelink transmitter UE1 906.

Compared with Wi-Fi, which uses full transmitter power for all channels (e.g., RTS and CTS channels), a device using sidelink may allow for adjustable interference protection zones (e.g., CTS interference protection zones) around sidelink receivers and may allow for better spatial reuse in the geographic zones around sidelink transmitters and sidelink receivers by implementing power control on each channel, including a dynamically adjustable power control on clear-to-send (CTS) channel power.

Spatial Reuse

Figure 10:
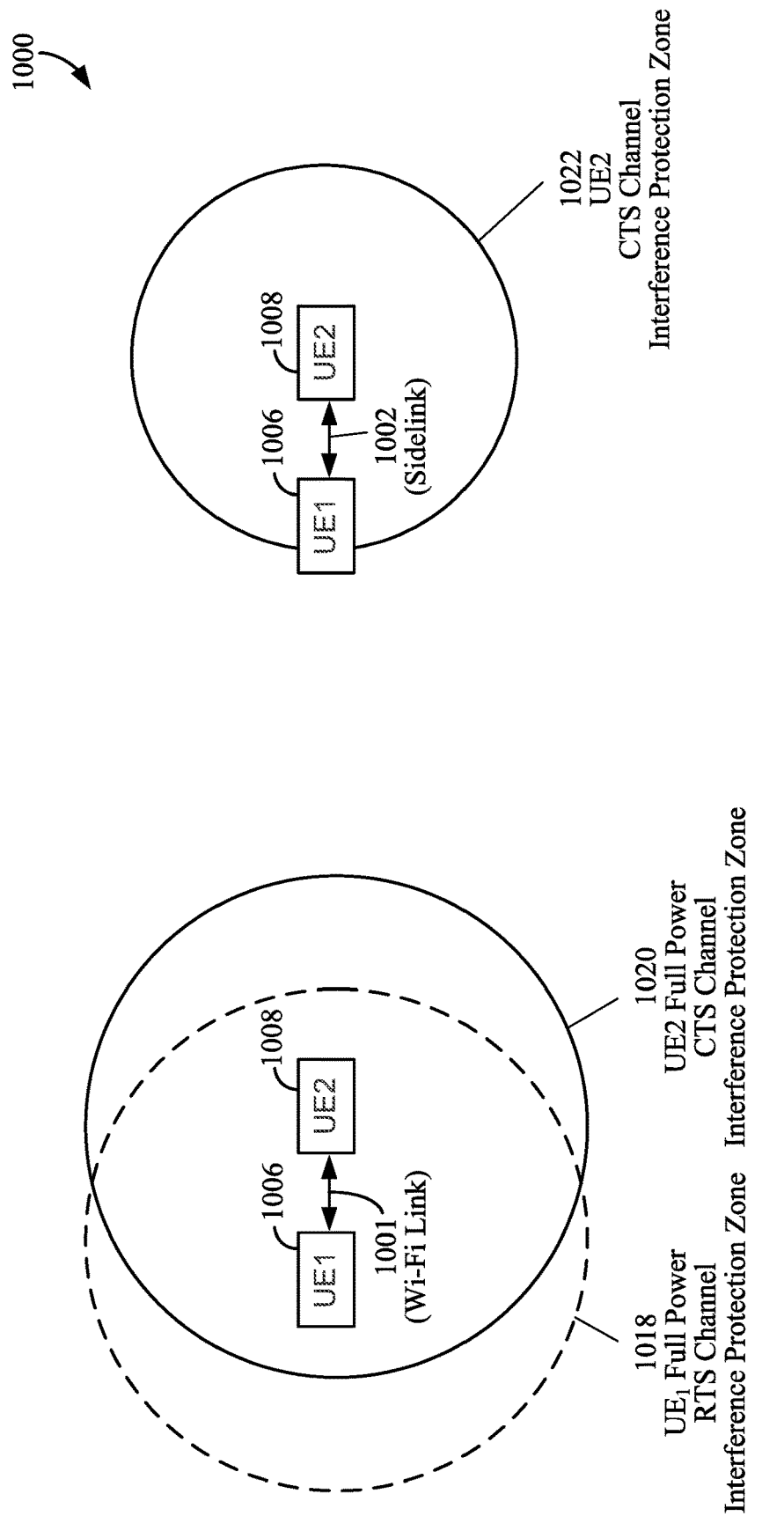
FIG. 10 is a diagram comparing spatial reuse for devices communicating using WiFi and sidelink for device-to-device communication according to some aspects of the present disclosure.

FIG. 10 is a diagram 1000 comparing spatial reuse for devices communicating using WiFi and sidelink for device-to-device communication according to some aspects of the present disclosure. The devices may be referred to as UE1 1006 and UE2 1008. On the left side of the diagram 1000, UE1 1006 and UE2 1008 communicate using a Wi-Fi link 1001. In known uses of Wi-Fi, both ready-to-send (RTS) and clear-to-send (CTS) are sent at full power. UE1 full power RTS interference protection zone 1018 and UE2 full power CTS interference protection zone 1020 are depicted in FIG. 10. As used herein, an interference protection zone may refer to a geographic zone (or area) surrounding a device. An interference protection zone may be referred to as an interference zone, a protection zone, and/or a silencing zone herein. The diameter of the interference protection zone may be determined, for example, based on the transmit power of a transmitter of the device, or a hypothetical transmitter of the device. Other ways may be used to determine the diameter of an interference protection zone without departing from the scope of the disclosure.

In some aspects, transmit power of the device, or transmit power used by the device in a channel (such as an RTS channel or a CTS channel) may be notified to neighboring entities (i.e., devices) via a reference signal (RS) transmitted from the device. In some aspects, a neighboring device may determine if it is in an interference protection zone by comparing a declared power level of the RS to a received power level of the RS. For example, if the power loss is less than fifty percent, the neighboring device may be in the interference protection zone. This example is illustrative and non-limiting. Other ways for a neighboring device to determine if it is in an interference protection zone of a transmitting device are acceptable. For example, in Wi-Fi, an RTS silencing signal and a CTS silencing signal may be transmitted. Any neighbor receiving an RTS silencing signal or a CTS silencing signal may hold back their RTS or CTS transmissions. In general, neighbors within an interference protection zone yield to both RTS and CTS of the transmitting devices. For at least these reasons, the neighbors within UE1 full power RTS interference protection zone 1018 and UE2 full power CTS interference protection zone 1020 are silenced in Wi-Fi. Accordingly, in Wi-Fi, because full power is used for both RTS and CTS channels, spatial reuse is reduced (e.g., because the interference protection zone is larger than necessary due to fact that RTS/CTS is always sent at full power).

Sidelink allows for better spatial reuse than Wi-Fi. On the right side of the diagram 1000, UE1 1006 and UE2 1008 communicate using a sidelink 1002. For ease of explanation, it may be assumed that UE1 1006 acts as a sidelink transmitter while UE2 1008 acts as a sidelink receiver. In some aspects, an interference protection zone (also referred to herein as an interference zone, a protection zone, and/or a silencing zone) may be established only around the sidelink receiver, e.g., UE2 1008. In some aspects, only CTS carries a silencing signal (accordingly, in such aspects, RTS may not carry a silencing signal). In some aspects, CTS silences neighbors, for example, by use of the silencing signal, and/or for example, because neighbors may yield the data channel to the device (e.g., UE2 1008) based on TX-yielding as described above. However, the area of a CTS interference protection zone in a network employing sidelink may be less than that of a comparable network employing Wi-Fi.

In sidelink, CTS channel power (e.g., CTS transmit power from the sidelink receiver UE2 1008) is inversely proportional to the received RTS channel power. In other words, when the received RTS channel power is high, the transmitted CTS channel power is low. A simplified mathematical representation of this concept appears below,

*CTS* transmit power=*C*/received RTS power, where C is a pre-stored/pre-assigned constant parameter for CTS power control (e.g., 450, FIG. 4) that may be assigned to the device (e.g., UE1 1006, UE2 1008) by the manufacturer of the device. The value of the pre-stored/pre-assigned constant parameter, C, for CTS power control does not change—it is not dynamic. Accordingly, when two devices (e.g., UE1 1006 and UE2 1008) are close to one another in terms of physical distance, the sidelink receiver (e.g., UE2 1008) may be able to transmit a CTS message on a CTS channel using less power than if the distance between the two devices is increased. Therefore, at least as a consequence to the inverse proportionality of CTS transmit power to received RTS power, a physically shorter link should silence a smaller neighborhood (a smaller geographic zone).

As depicted in the diagram 1000, the diameter of the UE2 CTS channel interference protection zone 1022 is smaller than that represented by the Wi-Fi model on the left side of the diagram 1000. It will be understood that the illustrations included in this disclosure are not drawn to scale. The diagram 1000 of FIG. 10 is meant only to depict that sidelink allows better spatial reuse (due to smaller interference protection zones) than Wi-Fi, in general.

However, setting CTS transmit power based on the value of the constant parameter C may be inefficient and/or ineffective in some scenarios. The constant parameter C does not change based on anything, including, for example, different objectives and/or use cases recognized by external entities. As such, for a given received RTS channel power, a CTS channel interference protection zone (e.g., UE2 CTS channel interference protection zone 1022) surrounding a sidelink receiver (e.g., UE2 1008) may not be changed even if, for example, the requirement for sidelink 1002 link reliability changes over time. By way of example, a high level of link reliability might warrant an increased size to an interference protection zone (to reduce interference from neighbors), while a relatively lower level of link reliability might warrant a decreased size to an interference protection zone (to improve spatial reuse). By way of example, a high level of traffic priority might warrant an increased size to an interference protection zone (to reduce interference from neighbors), while a relatively lower level of traffic priority might warrant a decreased size to an interference protection zone (to improve spatial reuse). By way of example, a full buffer status level might warrant an increased size to an interference protection zone (to reduce interference from neighbors), while a relatively more empty buffer status level might warrant a decreased size to an interference protection zone (to improve spatial reuse).

The following two non-limiting examples are provided to describe exemplary scenarios in which use of a constant parameter C for CTS channel power control may be inefficient and/or ineffective.

Example A: For a fixed link distance (e.g., distance between sidelink transmitter UE1 1006 and sidelink receiver UE2 1008 linked in device-to-device communication), a fixed received RTS channel power, and a fixed value for the constant parameter C, the UE2 CTS channel interference protection zone 1022 surrounding sidelink receiver UE2 1008 has an exemplary first diameter. The exemplary first diameter may be satisfactory for transfer of data (e.g., from sidelink transmitter UE1 1006 to sidelink receiver UE2 1008) related, for example, to a text message or voice over IP (VoIP) communication. However, the priority of the data being transferred may change. For example, a message with high priority may be transferred. In such a case, it may be desirable to provide the sidelink communication with a larger diameter protection zone (not shown) than that obtained using the fixed value for the constant parameter C.

Example B: For a fixed link distance (e.g., distance between sidelink transmitter UE1 1006 and sidelink receiver UE2 1008 linked in device-to-device communication), a fixed received RTS channel power, and a fixed value for the constant parameter C, the UE2 CTS channel interference protection zone 1022 surrounding sidelink receiver UE2 1008 has an exemplary first diameter. The exemplary first diameter may be satisfactory for transfer of data (e.g., from sidelink transmitter UE1 1006 to sidelink receiver UE2 1008) related, for example, to a text message or voice over IP (VoIP) communication. However, a scenario may exist in which, for example, there is not much data to transmit (e.g., a buffer status may indicate that a buffer is less than full), and therefore a lower modulation and coding scheme (MCS) can be used to transfer data. Consequently, it may be desirable to reduce the size of the interference protection zone to work toward an objective of increased spatial reuse. Nevertheless, because of the use of the fixed value for the constant parameter C, it is not possible to accommodate this desirable objective.

Problems encountered due to implementations of sidelink in which the constant/fixed value for the constant parameter C have been used to establish CTS channel power (and therefore establish the size of an interference protection zone around a sidelink receiver) may be overcome, for example, by use of a dynamic CTS transmit power scaling parameter. The dynamic CTS transmit power scaling parameter may be dynamically determined by a scheduling entity (e.g., eNB) (in a large time scale and/or in a small time scale) and/or a sidelink transmitter (e.g., UE1 1006), with respect to various objectives and/or use cases. One example of a use case may include selection of a modulation and coding scheme (MCS) based on a channel quality indicator (CQI) value returned in view of sending an RTS message in an RTS channel. Another example of a use case may be selecting to reduce power of a CTS channel as a way of controlling interference (e.g., interference management) in a vicinity of a given sidelink device. Another example of a use case may be selecting to reduce power of a CTS channel as a way to avoid TX-yielding. Another example of a use case may be selecting to increase power of a CTS channel if data packets waiting to be transmitted have a high priority that requires high reliability. By increasing the power of a CTS channel, the area of the protection zone surrounding the sidelink device (e.g., the sidelink receiver) is enlarged. As used herein, by way of example, the term "use case" may be understood to be a set of input parameters or conditions that, when met or obtained, result in an action being taken.

According to some aspects, a dynamic CTS transmit power scaling parameter may be used to adjust a transmit power of a CTS channel, and thereby adjust a size of a CTS channel interference protection zone. The dynamic CTS transmit power scaling parameter may be dynamically determined by a scheduling entity (e.g., eNB) (in a large and/or small time scale) with respect to different objectives and/or use cases (such as buffer status and traffic priority). According to some aspects of the present disclosure, a dynamic CTS transmit power scaling parameter may be dynamically determined by a sidelink transmitter (in a small time scale) with respect to different objectives and/or use cases (such as buffer status and traffic priority).

According to some aspects, a scheduling entity (e.g., an eNB) may assign one or more sidelink devices with a dynamic CTS transmit power scaling parameter via a radio resource control (RRC) message. In some aspects, this assignment may be conducted in a large time scale. In some aspects, this assignment may be link-specific. In some aspects, this assignment may be generic (e.g., covering all sidelink devices scheduled by the scheduling entity without regard to a specific link associated with the sidelink device). In some aspects, a dynamic CTS transmit power scaling parameter can be determined for a sidelink receiver based on a link traffic profile (e.g., evaluation of a link traffic profile). In some aspects, the link traffic profile may be generated by the sidelink transmitter. It is noted that a scheduling entity (e.g., an eNodeB) may always have a priority control on the whole network; accordingly, in some aspects, the link traffic profile may be generated by the scheduling entity. The link traffic profile may include at least one of a reliability requirement or a latency requirement of a data packet. In other words, the link traffic profile may include reliability requirements, latency requirements, or reliability and latency requirements. For example, a large dynamic CTS transmit power scaling parameter can be assigned to a link which requires high reliability and/or low latency. In other words, a link which requires high reliability and/or low latency may be assigned a larger dynamic CTS transmit power scaling parameter than a link which requires relatively lower reliability and/or not as low latency.

According to some aspects, a scheduling entity (e.g., eNB) may assign sidelink devices with a dynamic CTS transmit power scaling parameter via a control channel (e.g., a PDCCH 802, FIG. 8). In some aspects, this assignment may be conducted on a TTI-by-TTI basis (or on a frame-by-frame, subframe-by-subframe, or slot-by-slot basis). In other words, the dynamic CTS transmit power scaling parameter may be re-determined and sent to the scheduled entity on a TTI-by-TTI basis. In some aspects, this assignment may be link-specific. In some aspects, this assignment may be generic (e.g., covering all sidelink devices scheduled by the scheduling entity without regard to a specific link associated with the sidelink device).

According to some aspects, a sidelink transmitter (e.g., a scheduled entity, a UE) may assign a respective sidelink receiver (e.g., a different scheduled entity, a different UE) with a dynamic CTS transmit power scaling parameter via an RTS message in an RTS channel. In some aspects, this assignment may be conducted on a TTI-by-TTI basis (or on a frame-by-frame, subframe-by-subframe, or slot-by-slot basis). In other words, the dynamic CTS transmit power scaling parameter may be re-determined and sent to the scheduled entity on a TTI-by-TTI basis. In some aspects, this assignment may be link-specific. A sidelink transmitter may, for example, determine a dynamic CTS transmit power scaling parameter based on different objectives and/or use cases. In some aspects, a sidelink transmitter may, for example, determine a dynamic CTS transmit power scaling parameter based on buffer status. That is, a smaller dynamic CTS transmit power scaling parameter can be assigned to the sidelink receiver by the sidelink transmitter if there is not much data to transmit. According to another example, a larger dynamic CTS transmit power scaling parameter can be assigned to the sidelink receiver by the sidelink transmitter if the sidelink transmitter desires less spatial reuse (i.e., more interference protection) in a current slot or TTI due to a higher reliability requirement of the present data packet. According to another example, a larger dynamic CTS transmit power scaling parameter can be assigned to the sidelink receiver by the sidelink transmitter if the sidelink transmitter desires less spatial reuse (i.e., more interference protection) in a current slot or TTI due to higher traffic priority associated with data packets to be transmitted in a data channel. In general, a device may change the CTS channel power, relative to a power that would be obtained as a function of the pre-assigned constant parameter for CTS power control stored at the sidelink receiver device and the received RTS channel power, to dynamically increase or decrease a size of a CTS channel interference protection zone.

Figure 11:
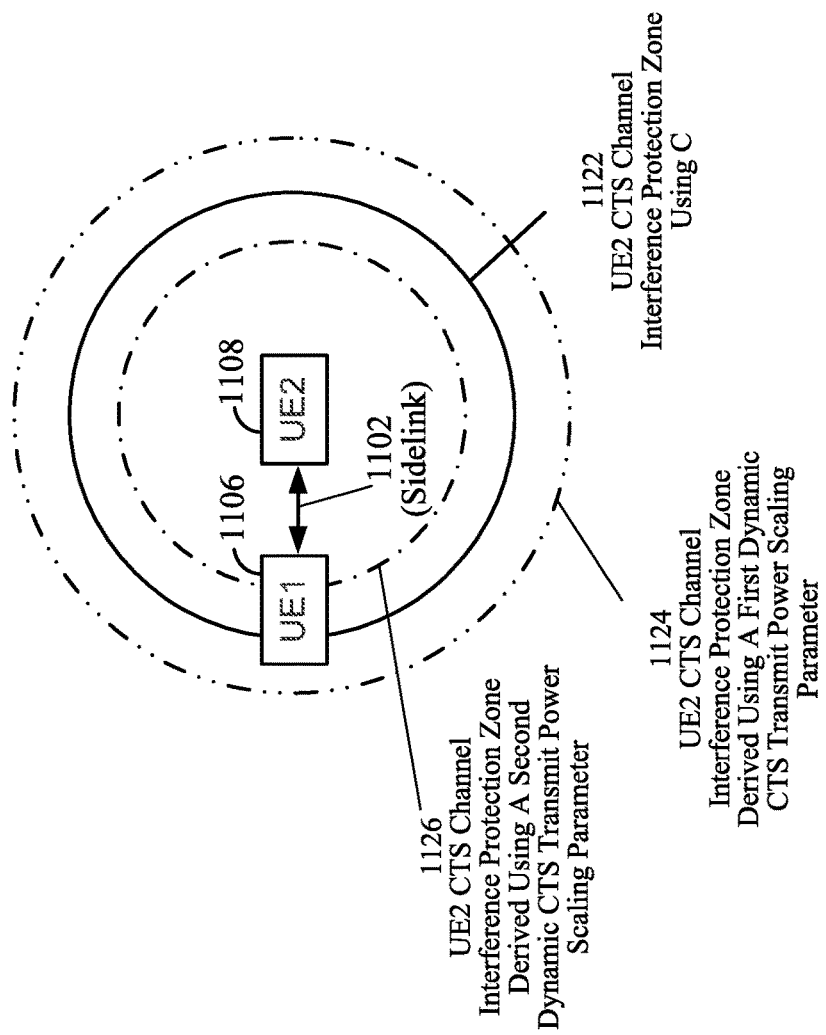
FIG. 11 is a diagram comparing spatial reuse for devices communicating using sidelink 1102 for device-to-device communication according to some aspects of the present disclosure.

FIG. 11 is a diagram 1100 comparing spatial reuse for devices communicating using sidelink 1102 for device-to-device communication according to some aspects of the present disclosure. The devices may be referred to as UE1 1106 and UE2 1108. In the diagram 1100 of FIG. 11, UE1 1106 and UE2 1108 communicate using a sidelink 1102.

For a fixed link distance (e.g., distance between sidelink transmitter UE1 1106 and sidelink receiver UE2 1108 linked in device-to-device communication), a fixed received RTS channel power, and a fixed value for the constant parameter, C, for CTS power control, the UE2 CTS channel interference protection zone 1122 surrounding sidelink receiver UE2 1108 has an exemplary first diameter. The exemplary first diameter may be satisfactory for transfer of data (e.g., from sidelink transmitter UE1 1106 to sidelink receiver UE2 1108) related, for example, to a text message or voice over IP (VoIP) communication. However, for the given conditions, the first diameter cannot change.

However, if, instead of relying on the fixed value for the constant parameter C, which may have been pre-stored/pre-assigned to the sidelink receiver UE2 1008, reliance was made on a dynamic CTS transmit power scaling parameter, which can be received from an eNB and/or another sidelink device, and whose value can be periodically adjusted, then the size of the UE2 CTS channel interference protection zone could be adjusted (e.g., altered, increased/decreased, changed). For example, a message with high priority may be transferred. In such a case, it may be desirable to provide the sidelink communication with a larger interference protection zone, which has a larger diameter than that obtained using the fixed value for the constant parameter C. FIG. 11 depicts a UE2 CTS channel interference protection zone 1124 that may be derived (e.g., obtained, calculated) as a function of a first dynamic CTS transmit power scaling parameter and a received RTS channel power. In such a case, a value of the first dynamic CTS transmit power scaling parameter can be calculated by an eNB and/or by another sidelink device, and sent to the sidelink receiver 1108 via a wireless interface. The first dynamic CTS transmit power scaling parameter may be used to change the size of the CTS interference protection zone by scaling a transmit power of the sidelink receiver 1108 during a CTS channel. In some aspects, the value of the dynamic CTS transmit power scaling parameter may be based on at least one of a use case, priority, quality of service (QoS), or buffer status.

By way of a different example, the exemplary first diameter of the UE2 CTS channel interference protection zone 1122 may be satisfactory for transfer of data (e.g., from sidelink transmitter UE1 1006 to sidelink receiver UE2 1008) related, for example, to a text message or voice over IP (VoIP) communication. However, a scenario may exist in which, for example, there is not much data to transmit, and therefore a lower modulation and coding scheme (MCS) can be used to transfer data. Consequently, it may be desirable to reduce the size of the interference protection zone to advance toward an objective of increased spatial reuse. Nevertheless, because of reliance on the fixed value for the constant parameter C, it is not possible to accommodate this objective.

However, if, instead of relying on the fixed value for the constant parameter C, which may have been pre-stored/pre-assigned to the sidelink receiver UE2 1008, reliance was made on a dynamic CTS transmit power scaling parameter, which can be received from an eNB and/or another sidelink device, and whose value can be periodically adjusted, then the size of the UE2 CTS channel interference protection zone could be adjusted (e.g., altered, increased/decreased, changed). For example, in the above-described example in which a smaller interference protection zone is desired, it may be desirable to provide the sidelink CTS transmission with the smaller interference protection zone, which has a smaller diameter than that obtained using the fixed value for the constant parameter C. FIG. 11 depicts a UE2 CTS channel interference protection zone 1126 that may be derived (e.g., obtained, calculated) as a function of a second dynamic CTS transmit power scaling parameter (wherein the second dynamic CTS transmit power scaling parameter is smaller than the first dynamic CTS transmit power scaling parameter) and a received RTS channel power. In such a case, a value of the second dynamic CTS transmit power scaling parameter can be calculated by an eNB and/or by another sidelink device, and sent to the sidelink receiver 1108 via a wireless interface. The second dynamic CTS transmit power scaling parameter may be used to change the size of the CTS interference protection zone by scaling a transmit power of the sidelink receiver 1108 during a CTS channel.

Figure 12:
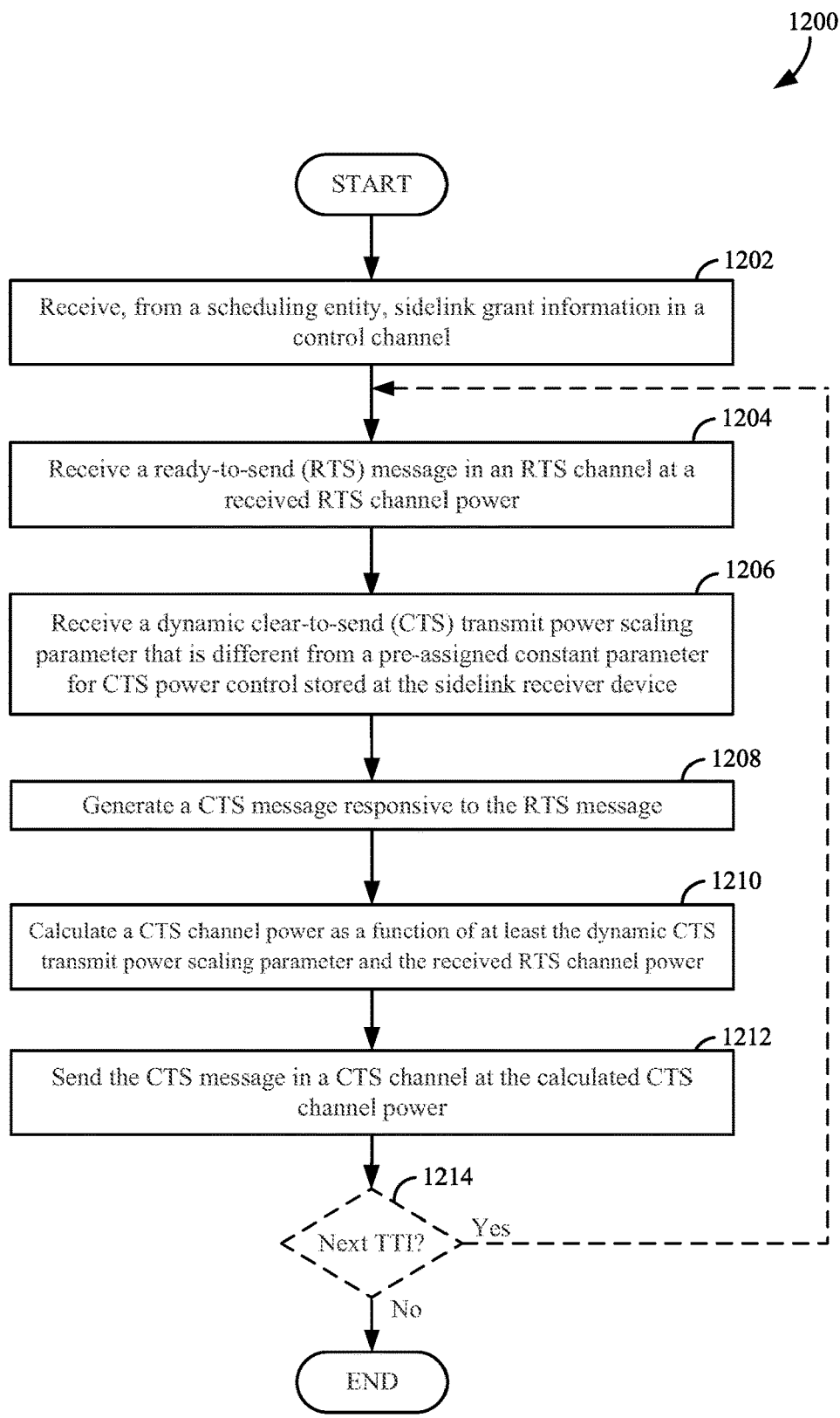
FIG. 12 is a diagram illustrating an example of various methods and/or processes according to some aspects of the present disclosure.

FIG. 12 is a diagram 1200 illustrating an example of various methods and/or processes according to some aspects of the present disclosure. In some configurations, such methods and/or processes may be operational, performed, and/or implemented in a scheduled entity 204 (e.g., a UE, a device), where the scheduled entity 204 may be a sidelink receiver. Although the description provided below with reference to FIG. 12 makes reference to a device, one of ordinary skill in the art will understand that such methods and/or processes may be operational, performed, and/or implemented in various apparatus and in various arrangements, sequences, and/or orders without necessarily deviating from the scope of the present disclosure. One of ordinary skill in the art will appreciate that any aspect(s) of the methods and/or processes described with reference FIG. 12 may be included in, added to, substituted for, or incorporated into, and/or otherwise used to modify any other aspect(s) described with reference to FIGS. 1-11 without necessarily deviating from the scope of the present disclosure.

At block 1202, the device (e.g., a sidelink receiver) may receive a grant, in a control channel, to conduct device-to-device communication during a predefined period. The grant may be received from a scheduling entity and the device-to-device communication may be via a link (e.g., a radio link) between the device and a second device that is different from the scheduling entity. In other words, the second device and the sidelink receiver may be linked in device-to-device communication. In some aspects, the scheduling entity may be a network access node. In some aspects, the network access node may be an eNodeB (eNB) or an access point (AP). The grant may allocate channels (e.g., blocks of time and frequency) within which various types or categories of communication may be conducted (e.g., an RTS channel, a CTS channel, a data channel). In one aspect, the grant may be a generic grant for device-to-device communication. In one aspect, the grant may be a link-specific grant for device-to-device communication. In one aspect, the device-to-device communication may be a sidelink communication. In one aspect, an RTS channel, a CTS channel, and a data channel are allocated within the predefined period to facilitate the device-to-device communication during the predefined period. The predefined period may be referred to as a TTI, a frame, a subframe, a slot, or various other predefined periods as known to those of skill in the art. For example, the communication circuit 440 shown and described above in reference to FIG. 4 may receive the grant.

At block 1204, the device may receive a ready-to-send (RTS) message in an RTS channel at a received RTS channel power. An RTS message may be sent from a sidelink transmitter to the sidelink receiver. It may indicate, among other things, that data is ready to be sent to the sidelink receiver. The content of an RTS message is known to those skilled in the art and will not be described herein for purposes of brevity. For example, the communication circuit 440 shown and described above in reference to FIG. 4 may receive the RTS message.

At block 1206, the device may receive a dynamic clear-to-send (CTS) transmit power scaling parameter that is different from a pre-assigned constant parameter for CTS power control (e.g., 450, FIG. 4) stored at the sidelink receiver device (e.g., scheduled entity) (e.g., 204, FIGS. 2, 4). In some aspects, the device may receive the dynamic CTS transmit power scaling parameter from, for example, a scheduling entity via a radio resource control (RRC) message, the scheduling entity via a control channel message, or a sidelink transmitter via the RTS message. In some aspects, the dynamic CTS transmit power scaling parameter may be a multiplier used to increase or decrease the CTS channel power. In some aspects, the dynamic CTS transmit power scaling parameter may be a multiplier used to increase or decrease a CTS channel interference protection zone (e.g., by increasing or decreasing the CTS channel power). In some aspects, the dynamic CTS transmit power scaling parameter may be a multiplier used to increase or decrease a CTS channel interference protection zone (e.g., by increasing or decreasing the CTS channel power), in comparison to the CTS channel interference protection zone that would be realized as a function of the pre-assigned constant parameter for CTS power control (e.g., 450, FIG. 4) stored at the sidelink receiver device (e.g., scheduled entity) (e.g., 204, FIGS. 2, 4) and the RTS channel power. In some aspects, the dynamic CTS transmit power scaling parameter may be a real number having a value greater than zero. For example, the communication circuit 440 shown and described above in reference to FIG. 4 may receive the dynamic CTS transmit power scaling parameter.

At block 1208, the device may generate a CTS message responsive to the RTS message. A CTS message may indicate, among other things, that the sidelink receiver is ready to accept data. In some aspects, the CTS message may include a reference signal (RS) that may be used by other sidelink receivers/transmitters (e.g., UEs, devices) to determine if they are within a CTS channel interference protection zone of the device. The content of a CTS message is known to those skilled in the art and will not be described herein for purposes of brevity. For example, the processing circuit 442 shown and described above in reference to FIG. 4 may generate the CTS message.

At block 1210, the device may calculate (e.g., obtain, derive) a CTS channel power as a function of at least the dynamic CTS transmit power scaling parameter and the received RTS channel power. In some aspects, the calculated CTS channel power may be different from (e.g., greater or lesser compared to) a CTS channel power derived using the pre-assigned constant parameter for CTS power control (e.g., 450, FIG. 4) stored at the sidelink receiver device (e.g., scheduled entity) (e.g., 204, FIGS. 2, 4). For example, the processing circuit 442 shown and described above in reference to FIG. 4 may calculate the CTS channel power as a function of at least the dynamic CTS transmit power scaling parameter and the received RTS channel power.

At block 1212, the device may send the CTS message in a CTS channel at the calculated CTS channel power. For example, the communication circuit 440 shown and described above in reference to FIG. 4 may send the CTS message in a CTS channel at the calculated CTS channel power.

According to some aspects, the RTS channel, the CTS channel, and a data channel may be allocated within in a predefined period to facilitate device-to-device communication during the predefined period.

In some aspects, the aspects described in connection with FIG. 12 may be repeated during each succeeding predefined period (e.g., repeated during each frame, slot, subframe, TTI allocated for sidelink communication). For example, at 1214 if the sidelink communication is to continue for the next TTI, method may return to block 1204. If the sidelink communication does not continue for the next TTI, the method may end. Accordingly, in some implementations, dynamic power control for CTS channel transmissions can be achieved on a periodic or repeated basis (e.g., on a TTI-by-TTI, frame-by-frame, subframe-by-subframe, or slot-by-slot basis). In other words, the dynamic CTS transmit power scaling parameter may be re-determined and sent to the scheduled entity on a TTI-by-TTI basis. Thus, in sidelink for example, CTS channel power can be adjusted based on use of a dynamic clear-to-send (CTS) transmit power scaling parameter that is different from a pre-assigned constant parameter for CTS power control stored at the sidelink receiver device. This may allow for an external device (e.g., an eNB, a sidelink transmitter) to adjust an interference protection zone (e.g., an interference zone, a protection zone, and/or a silencing zone) surrounding a sidelink receiver device based on, for example, various objectives and or use cases. The various objectives and/or use cases may, for example, relate to increasing or decreasing spatial reuse in a geographic area around the sidelink receiver, and/or adjusting interference protection zones in a geographic area around the sidelink receiver, for example, in response to changes in reliability requirements, traffic priority, and/or buffer status for data packets being sent to the sidelink receiver. In other words this may allow for a changing of the CTS channel power, relative to a power that would be obtained as a function of the pre-assigned constant parameter for CTS power control stored at the sidelink receiver device and the received RTS channel power, to dynamically increase or decrease a size of a CTS channel interference protection zone.

Figure 13:
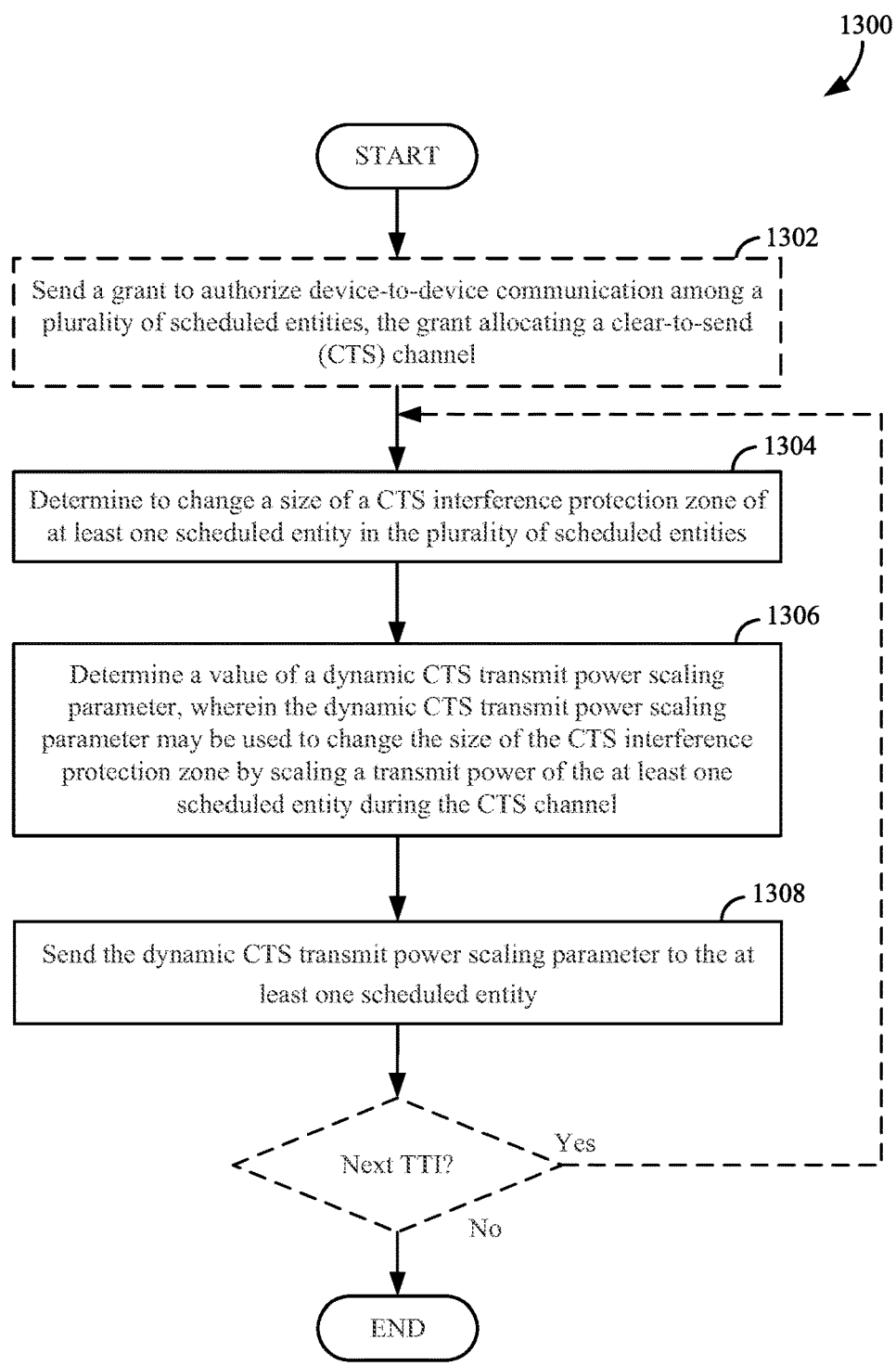
FIG. 13 is a diagram illustrating another example of various methods and/or processes according to some aspects of the present disclosure.

FIG. 13 is a diagram 1300 illustrating another example of various methods and/or processes according to some aspects of the present disclosure. According to some aspects, such methods and/or processes may be operational, performed, and/or implemented by a scheduling entity 202, where the scheduling entity 202 may be, for example, an eNB or an AP. According to other aspects, such methods and/or processes may be operational, performed, and/or implemented by a scheduled entity 204 (e.g., a sidelink transmitter) linked in device-to-device communication with another scheduled entity (e.g., a sidelink receiver). Although the description provided below with reference to FIG. 13 makes reference to a transmitting device, one of ordinary skill in the art will understand that such methods and/or processes may be operational, performed, and/or implemented in various apparatus and in various arrangements, sequences, and/or orders without necessarily deviating from the scope of the present disclosure. One of ordinary skill in the art will appreciate that any aspect(s) of the methods and/or processes described with reference FIG. 13 may be included in, added to, substituted for, or incorporated into, and/or otherwise used to modify any other aspect(s) described with reference to FIGS. 1-12 without necessarily deviating from the scope of the present disclosure.

At block 1302, when the transmitting device is a scheduling entity, the scheduling entity may send a grant to authorize device-to-device communication among a plurality of scheduled entities, the grant allocating a clear-to-send (CTS) channel. The device-to-device communication may be a sidelink communication. The grant may allocate various other channels. Block 1302 is shown as an optional step, which may be taken when the transmitting device is a scheduling entity, however, the transmitting device may also be a scheduled entity (e.g., a sidelink transmitter); in which case block 1302 may not be pertinent. For example, the communication circuit 340 shown and described above in reference to FIG. 3 may send the grant.

At block 1304, the transmitting device may determine to change a size of a CTS interference protection zone of at least one scheduled entity in the plurality of scheduled entities. According to some aspects, determining to change the size of the CTS interference protection zone may be based on various objectives and/or cases, such as, for example, a change to a reliability requirement of a link associated with the scheduled entity. According to some aspects, determining to change the size of the CTS interference protection zone may be based on an evaluation of buffer status. According to some aspects, determining to change the size of the CTS interference protection zone may be based on an evaluation of a link traffic profile, wherein the link traffic profile indicates at least one of a reliability requirement or a latency requirement of a link associated with the scheduled entity. According to some aspects, the evaluation may be based, for example, on the reliability requirement, the latency requirement, or the reliability and latency requirements. The disclosure does not limit the evaluation to evaluation of these requirements. For example, the processing circuit 342 shown and described above in reference to FIG. 3 may determine to change a size of a CTS interference protection zone.

At block 1306, the scheduling entity may determine (e.g., obtain, calculate, derive) a value of a dynamic CTS transmit power scaling parameter, wherein the dynamic CTS transmit power scaling parameter may be used to change the size of the CTS interference protection zone by scaling a transmit power of the at least one scheduled entity during the CTS channel. In some aspects, the scheduling entity may determine the value of a dynamic CTS transmit power scaling parameter. For example, the processing circuit 342 shown and described above in reference to FIG. 3 may determine the value of a dynamic CTS transmit power scaling parameter.

At block 1308, the scheduling entity may send the dynamic CTS transmit power scaling parameter to the at least one scheduled entity. According to some aspects, the scheduling entity may send the dynamic CTS transmit power scaling parameter via a radio resource control (RRC) message or via a control channel allocated by the grant. The control channel may be, for example, a PDCCH (e.g., 802, FIG. 8). According to some aspects, a sidelink transmitter (e.g., a scheduled entity in device-to-device communication with the at least one scheduled entity (e.g., a sidelink receiver)) may send the dynamic CTS transmit power scaling parameter to the at least one scheduled entity via a ready-to-send (RTS) message in an RTS channel. For example, the communication circuit 340 shown and described above in reference to FIG. 3 may send the dynamic CTS transmit power scaling parameter to the at least one scheduled entity.

According to some aspects, the dynamic CTS transmit power scaling parameter may be specific to a link associated with the scheduled entity.

According to some aspects, the dynamic CTS transmit power scaling parameter may be re-determined (i.e., determined again, determined anew) and sent to the scheduled entity on a TTI-by-TTI basis (or on a frame-by-frame, subframe-by-subframe, or slot-by-slot basis).

According to some aspects, the scheduling entity may determine the value of the dynamic CTS transmit power scaling parameter over a plurality of predefined periods (e.g., a large/long/slow time scale). According to other aspects, the scheduling entity may determine the value of the dynamic CTS transmit power scaling parameter in one predefined period (e.g., a short/fast time scale). The one or more predefined periods may be described, for example, as one or more frames, subframes, slots, TTIs, etc. Accordingly, by way of example, if at block 1310, the next TTI is to include sidelink communication, then the method may return to block 1304. If no further sidelink communications are to be conducted, the method may stop.

According to some aspects, when the transmitting device is a scheduling entity, the method may include sending the dynamic CTS transmit power scaling parameter via a radio resource control (RRC) message or via a control channel allocated by the grant. According to some aspects, when the transmitting device is a scheduling entity, the method may include determining to change the size of the CTS interference protection zone based on a change to a reliability requirement of a link associated with the scheduled entity. According to some aspects, when the transmitting device is a scheduling entity, the method may include determining to change the size of the CTS interference protection zone based on an evaluation of a link traffic profile, wherein the link traffic profile indicates at least one of a reliability or a latency requirement of a link associated with the scheduled entity. According to some aspects, when the transmitting device is a scheduling entity, the method may include determining the value of the dynamic CTS transmit power scaling parameter based on at least one of a use case, priority, quality of service (QoS), or buffer status.

According to some aspects, the dynamic CTS transmit power scaling parameter is re-determined and sent to the scheduled entity on a TTI-by-TTI basis.

According to some aspects, when the transmitting device is a sidelink transmitter device linked in device-to-device communication with a sidelink receiver device, the method may include determining to change the size of the CTS interference protection zone based on a change to at least one of a reliability or a latency requirement of a packet of data to be transported to the sidelink receiver device. According to some aspects, when the transmitting device is a sidelink transmitter device linked in device-to-device communication with a sidelink receiver device, the method may include determining to change the size of the CTS interference protection zone based on an evaluation of an amount of data to be transported to the to the sidelink receiver device.

Figure 14:
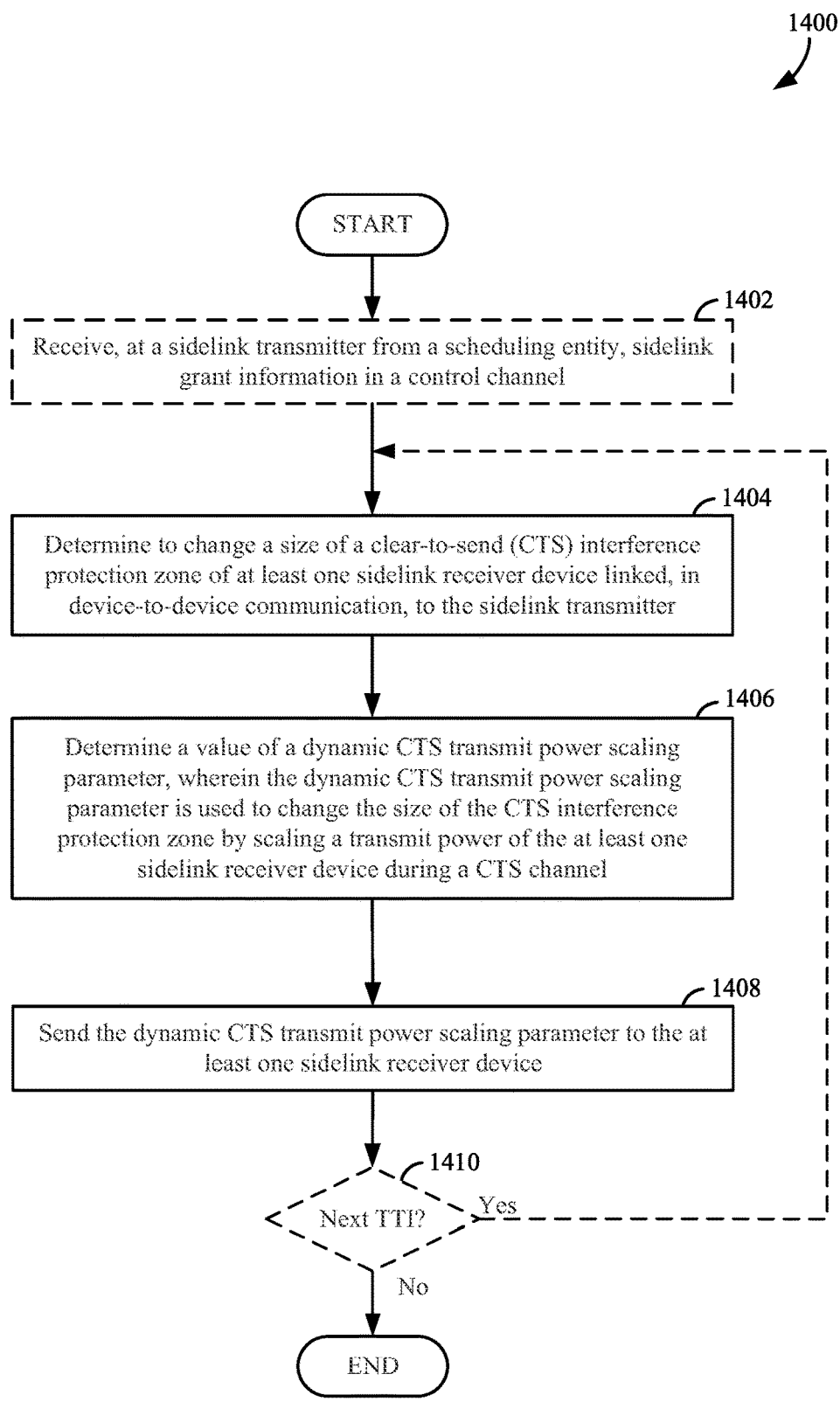
FIG. 14 is a diagram illustrating another example of various methods and/or processes according to some aspects of the present disclosure.

FIG. 14 is a diagram 1400 illustrating another example of various methods and/or processes according to some aspects of the present disclosure. In some configurations, such methods and/or processes may be operational, performed, and/or implemented in a scheduled entity 204 (e.g., a UE, a device), where the scheduled entity 204 may be a sidelink transmitter. Although the description provided below with reference to FIG. 14 makes reference to a device, one of ordinary skill in the art will understand that such methods and/or processes may be operational, performed, and/or implemented in various apparatus and in various arrangements, sequences, and/or orders without necessarily deviating from the scope of the present disclosure. One of ordinary skill in the art will appreciate that any aspect(s) of the methods and/or processes described with reference FIG. 14 may be included in, added to, substituted for, or incorporated into, and/or otherwise used to modify any other aspect(s) described with reference to FIGS. 1-13 without necessarily deviating from the scope of the present disclosure.

At block 1402, the device (e.g., a sidelink transmitter) may receive a grant, in a control channel, to conduct device-to-device communication during a predefined period. The grant may be received from a scheduling entity and the device-to-device communication may be via a link (e.g., a radio link) between the device and a second device (e.g., a sidelink receiver) that is different from the scheduling entity. In some aspects, the scheduling entity may be a network access node. In some aspects, the network access node may be an eNodeB (eNB) or an access point (AP). For example, the communication circuit 440 shown and described above in reference to FIG. 4 may receive the grant.

The grant may allocate channels (e.g., blocks of time and frequency) within which various types or categories of communication may be conducted (e.g., an RTS channel, a CTS channel, a data channel). In one aspect, the grant may be a generic grant for device-to-device communication. In one aspect, the grant may be a link-specific grant for device-to-device communication. In one aspect, the device-to-device communication may be a sidelink communication. In one aspect, an RTS channel, a CTS channel, and a data channel are allocated within in the predefined period to facilitate the device-to-device communication during the predefined period. The predefined period may be referred to as a TTI, a frame, a subframe, a slot, or various other predefined periods as known to those of skill in the art.

At block 1404, the sidelink transmitter device may determine to change a size of a clear-to-send (CTS) interference protection zone of at least one sidelink receiver device linked, in device-to-device communication, to the sidelink transmitter. According to some aspects, determining to change the size of the CTS interference protection zone may be based on various objectives and/or cases, such as, for example, a change to a reliability requirement of a link associated with the at least one sidelink receiver. According to some aspects, determining to change the size of the CTS interference protection zone may be based on an evaluation of buffer status. According to some aspects, determining to change the size of the CTS interference protection zone may be based on an evaluation of a link traffic profile, wherein the link traffic profile indicates at least one of a reliability requirement or a latency requirement of a link associated with the at least one sidelink receiver. According to some aspects, the evaluation may be based, for example, on the reliability requirement, the latency requirement, or the reliability and latency requirements. The disclosure does not limit the evaluation to evaluation of these requirements. In some aspects, the sidelink transmitter may determine to change the size of the CTS interference protection zone based on a change to a latency requirement and/or a reliability requirement of a packet of data to be transported to the at least one sidelink receiver device. In some aspects, the sidelink transmitter may determine to change the size of the CTS interference protection zone based on an evaluation of the amount of data to be transported to the to the sidelink receiver device (e.g., where the amount of data to be transported may be reflected in a buffer status). For example, the processing circuit 442 shown and described above in reference to FIG. 4 may determine to change the size of a clear-to-send (CTS) interference protection zone of at least one sidelink receiver device linked, in device-to-device communication, to the sidelink transmitter.

At block 1406, the sidelink transmitter device may determine (e.g., obtain, calculate, derive) a value of a dynamic CTS transmit power scaling parameter, wherein the dynamic CTS transmit power scaling parameter may be used to change the size of the CTS interference protection zone by scaling a transmit power of the at least one sidelink receiver device during the CTS channel. In some aspects, the sidelink transmitter device may determine the value of a dynamic CTS transmit power scaling parameter locally or remotely. In some aspects, the sidelink transmitter device may determine the value of a dynamic CTS transmit power scaling parameter partially or completely. For example, the processing circuit 442 shown and described above in reference to FIG. 4 may determine the value of a dynamic CTS transmit power scaling parameter.

At block 1408, the sidelink transmitter device may send the dynamic CTS transmit power scaling parameter to the at least one sidelink receiver device. According to some aspects, the sidelink transmitter may send the dynamic CTS transmit power scaling parameter via a radio resource control (RRC) message or via a control channel allocated by a grant. The control channel may be, for example, a PDCCH (e.g., 802, FIG. 8). According to some aspects, the sidelink transmitter device may send the dynamic CTS transmit power scaling parameter to the at least one sidelink receiver device via a ready-to-send (RTS) message in an RTS channel. For example, the communication circuit 440 shown and described above in reference to FIG. 4 may send the dynamic CTS transmit power scaling parameter to the at least one sidelink receiver device.

According to some aspects, the dynamic CTS transmit power scaling parameter may be specific to a link associated with the sidelink receiver.

According to some aspects, the dynamic CTS transmit power scaling parameter may be re-determined (i.e., determined again, determined anew) and sent to the sidelink receiver device on a TTI-by-TTI basis (or on a frame-by-frame, subframe-by-subframe, or slot-by-slot basis). In some aspects, some aspects described in connection with FIG. 14 may be repeated during each succeeding predefined period (e.g., repeated during each frame, slot, subframe, TTI allocated for sidelink communication). For example, at 1410 if the sidelink communication is to continue for the next TTI, method may return to block 1404. If the sidelink communication does not continue for the next TTI, the method may end. Accordingly, in some implementations, dynamic power control for CTS channel transmissions can be achieved on a periodic or repeated basis (e.g., on a TTI-by-TTI, frame-by-frame, subframe-by-subframe, or slot-by-slot basis). In other words, the dynamic CTS transmit power scaling parameter may be re-determined and sent to the scheduled entity on a TTI-by-TTI basis. Thus, in sidelink for example, CTS channel power can be adjusted based on use of a dynamic clear-to-send (CTS) transmit power scaling parameter that is different from a pre-assigned constant parameter for CTS power control stored at the sidelink receiver device. This may allow for an external device (e.g., an eNB, a sidelink transmitter) to adjust an interference protection zone (e.g., an interference zone, a protection zone, and/or a silencing zone) surrounding a sidelink receiver device based on, for example, various objectives and or use cases.

Figure 15:
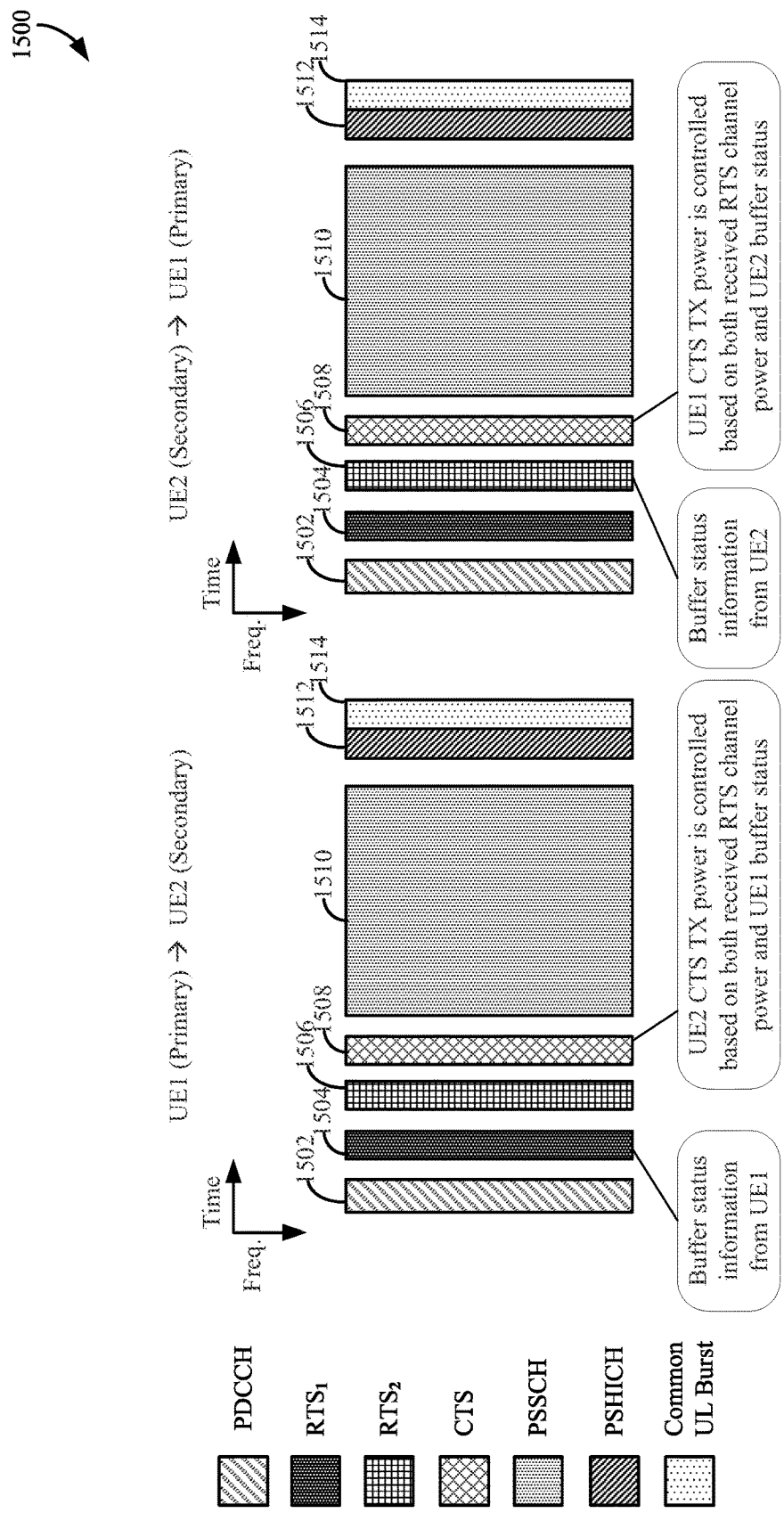
FIG. 15 is a diagram illustrating two exemplary sidelink-centric subframes used for unicast communication according to some aspects of the present disclosure.

FIG. 15 is a diagram 1500 illustrating two exemplary sidelink-centric subframes used for unicast communication according to some aspects of the present disclosure. The descriptions of each channel identified in the diagram 1500 were presented in connection with FIG. 8 and will not be repeated for purposes of brevity. The channels include the PDCCH 1502 channel, the RTS1 1504 channel, the RTS2 1506 channel, the CTS 1508 channel, the PSSCH 1510 channel, the PSHICH 1512 channel and the common UL burst 1514 channel. FIG. 15 illustrates an option in which CTS channel power (e.g. CTS TX power) may be controlled by the sidelink device based on an evaluation of buffer status information in an RTS channel and on the received RTS channel power. In the diagram 1500, on both the right and left sides of the diagram 1500, UE1 may be designated as a Primary and UE2 may be designated as a Secondary.

In the diagram 1500 on the left side, UE1 has data to send to UE2. UE1 may therefore be referred to as a sidelink transmitter, while UE2 may be referred to as a sidelink receiver. UE1 may include information, such as buffer status (e.g., amount of data in queue waiting to be sent to UE2) in an RTS message sent on the RTS1 1504 channel. The RTS message may be received at UE2 at a power level referred to as the received RTS channel power. UE2 may evaluate the buffer status of UE1 (e.g., UE1 buffer status) and may control the transmitter power during the CTS 1508 channel (e.g., the CTS TX power) based on both the received RTS channel power and the UE1 buffer status.

In the diagram 1500 on the right side, UE2 has data to send to UE1. UE2 may therefore be referred to as a sidelink transmitter, while UE1 may be referred to as a sidelink receiver. UE2 may include information, such as buffer status (e.g., amount of data in queue waiting to be sent to UE1) in an RTS message sent on the RTS2 1506 channel. The RTS message may be received at UE1 at a power level referred to as the received RTS channel power. UE1 may evaluate the buffer status of UE2 (e.g., UE2 buffer status) and may control the transmitter power during the CTS 1508 channel (e.g., the CTS TX power) based on both the received RTS channel power and the UE2 buffer status.

RTS and Data Channel Power

Note that in some aspects of sidelink communication, power control on RTS and data occur in a large time scale based on historical channel conditions. In some scenarios, the RTS channel power and data channel power may be set equal to one another. In some scenarios, however, setting the RTS channel power and data channel power equal to one another might be inefficient in terms of interference reduction to neighboring links. The following non-limiting examples are provided to describe exemplary scenarios in which setting the RTS channel power and data channel power to be different from one another might provide for increased efficiency in terms of interference reduction to neighboring links.

Example A: Assume an instantaneous CQI is better than an expected CQI (e.g., obtained from a historical record) and there is not much data to transmit. In this case, using less power to transmit data in the data channel in comparison to the power used to transmit an RTS message in the RTS channel, and/or using a lower modulation and coding scheme (MCS) during transmission of data in the data channel in comparison to that used to transmit the RTS message in the RTS channel, can reduce the interference to neighboring links during the time allocated for the data channel.

Example B: Assume a sidelink data transmission will be blocked by a higher priority receiver (e.g., due to TX-yielding as described above) if the data channel power is equal to the RTS channel power. In this case, the sidelink transmitter can choose to reduce its data TX power (i.e., the data channel power) to a certain extent such that it meets a TX-yielding threshold (i.e., not triggering TX-yielding). Consequently, the data transmission of the sidelink transmitter may continue without interfering with the higher priority receiver too much. That is, some interference may occur, but may be at an acceptable level.

Problems encountered due to implementations of sidelink in which the data channel power and RTS channel power are set to be the same may be overcome, for example, by use of a device with the capability of dynamically determining transmitter power and/or MCS for at least some of the channels being transmitted. In one aspect, the device may use less power in transmission of data in a data channel than it uses for transmission of an RTS signal in an RTS channel in order to reduce the interference to neighboring links. The device may dynamically determine the MCS and transmit power if some conditions are satisfied, for example, the conditions may include a lower MCS is selected and/or a better than expected CQI is identified. The conditions may further include consideration of the level of interference imposed on a higher priority receiver. That is, the device may consider the extent to which transmissions at the reduced power of the data channel of the device may interfere with the higher priority receiver, and may further adjust (e.g., reduce) the data channel power such that the interference is at or below a predetermined acceptable level.

Other conditions may be imposed on the data transmissions made by the device. For example, in one implementation, data channel power may not be greater than RTS channel power. This condition may hold even if violation of this condition would not violate any other conditions imposed on the device. In some implementations, violation of this condition could cause trouble in interference management.

In some implementations, an instantaneous CQI may be reported via CTS. It is noted that the instantaneous CQI may be determined with respect to the transmit power of RTS (i.e., the RTS channel power).

Figure 16:
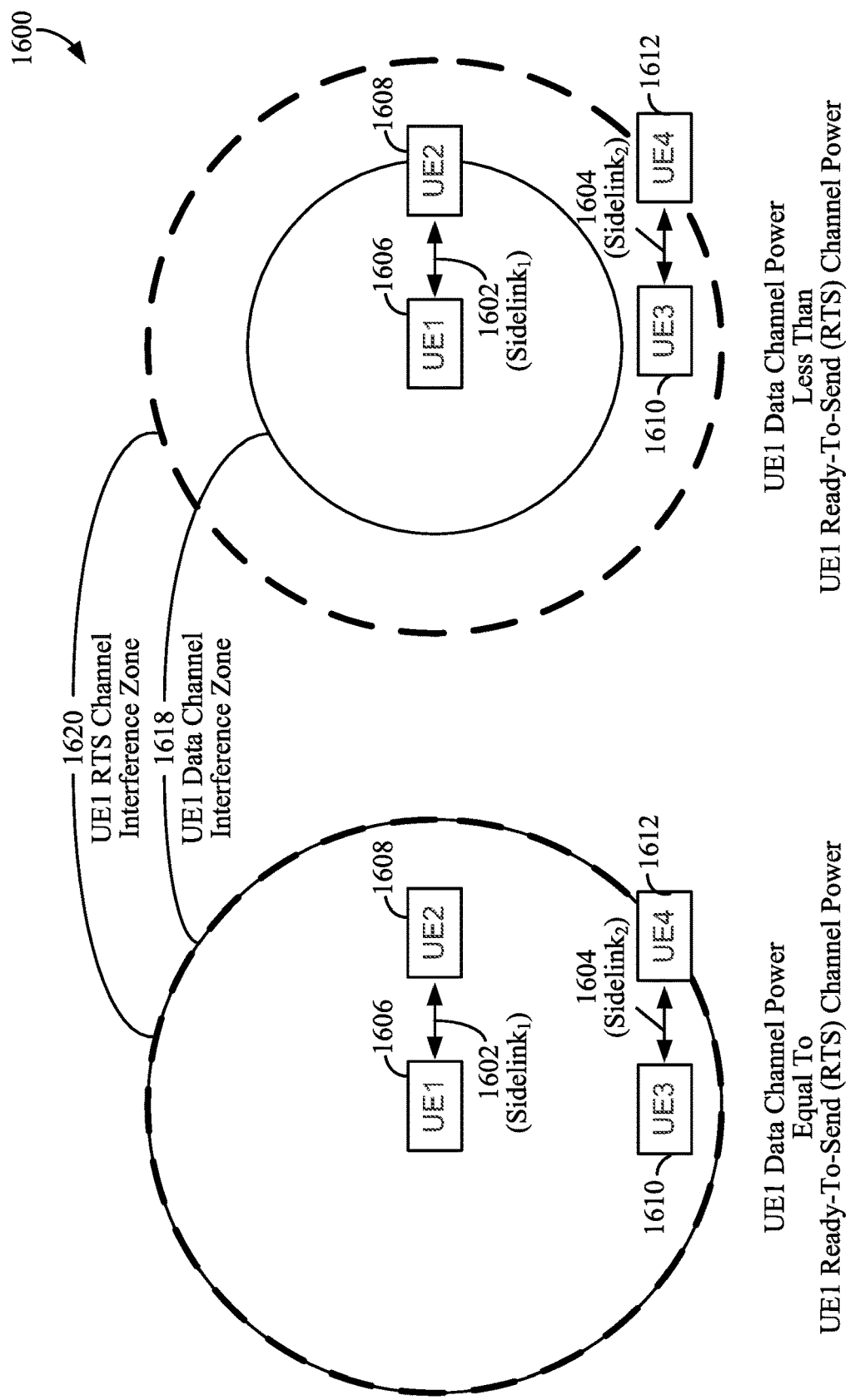
FIG. 16 is a diagram illustrating a reduction in geographic size of a data interference zone according to some aspects of the present disclosure.

FIG. 16 is a diagram 1600 illustrating a reduction in geographic size of a data interference zone according to some aspects of the present disclosure. The illustration depicts four devices (UE1 1606, UE2 1608, UE3 1610, and UE4 1612). UE1 1606 may have established a sidelink (e.g., Sidelink1 1602) with UE2 1608. UE3 1610 may have established a sidelink (e.g., Sidelink2 1604) with UE4 1612.

On the left side of the diagram 1600, a condition exists where the data channel power and RTS channel power of UE1 1606 are equal. Under this condition, the outer edges of a data channel interference zone 1618 of UE1 1606 and an RTS channel interference zone 1620 of UE1 1606 are coincident with each other. In other words, the data channel interference zone 1618 and the RTS channel interference zone 1620 occupy the same geographic areas. UE3 1610 (and UE4 1612) are within both the data channel interference zone 1618 and the RTS channel interference zone 1620 of UE1 1606.

On the right side of the diagram 1600, a condition exists where the data channel power of UE1 1606 is less than the RTS channel power of UE1 1606. In one implementation, the condition may exist when an instantaneous channel condition (e.g., an instantaneous channel condition of the RTS channel between UE1 1606 and UE2 1608) may be better than an expected channel condition. Under this condition, the outer edges of the data channel interference zone 1618 of UE1 1606 are within the RTS channel interference zone 1620 of UE1 1606. In other words, the data channel interference zone 1618 occupies a smaller geographic area than that of the RTS channel interference zone 1620. UE3 1610 (and UE4 1612) are within RTS channel interference zone 1620 of UE1 1606; however, UE3 1610 (and UE4 1612) are outside of the data channel interference zone 1618 of UE1 1606. Accordingly, UE3 1610 may be able to transmit data to UE4 1612 on sidelink 2 1604 at the same time as UE1 1606 is transmitting data to UE2 1608 on sidelink 1 1602.

Figure 17:
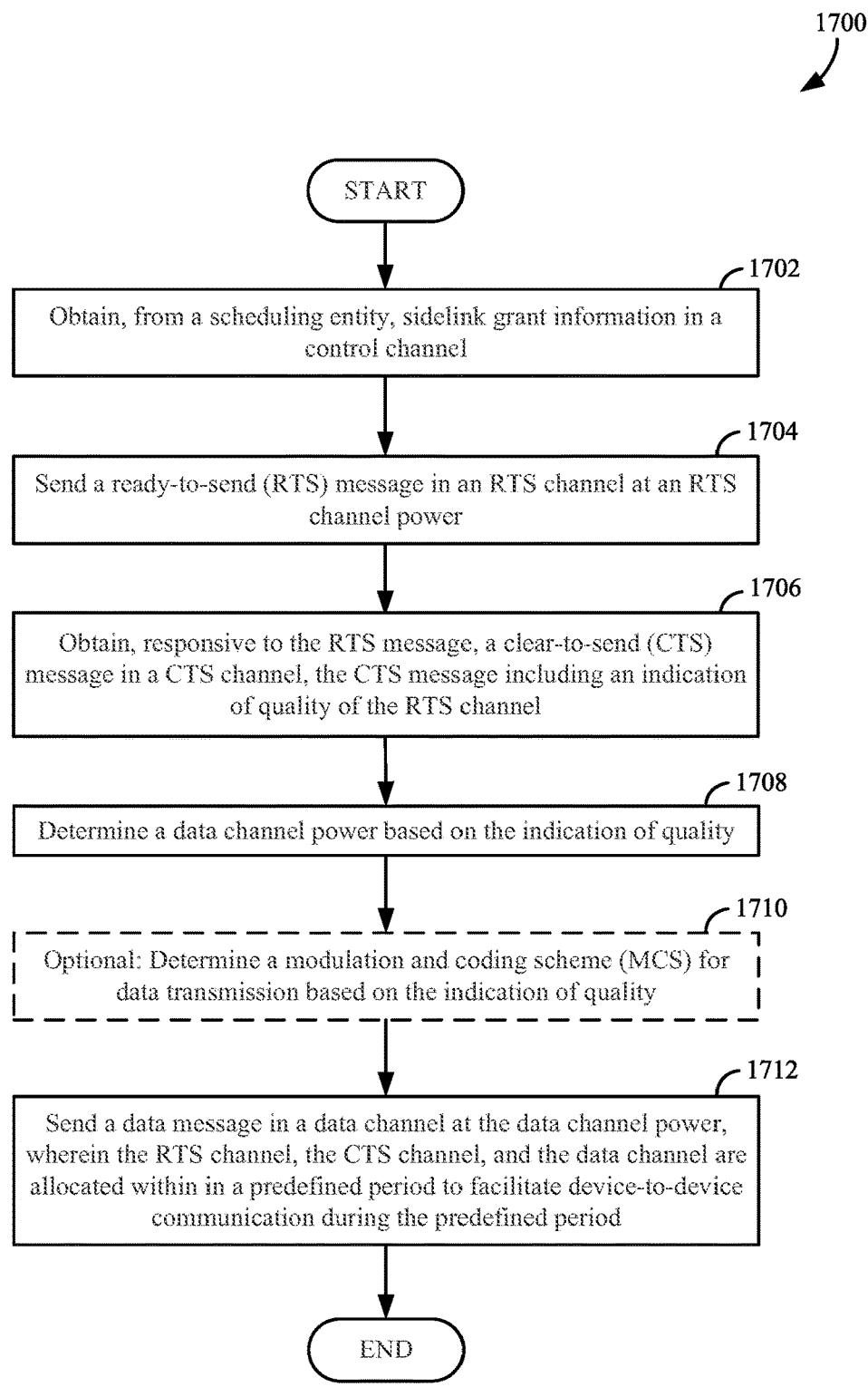
FIG. 17 is a diagram illustrating an example of various methods and/or processes according to some aspects of the present disclosure.

FIG. 17 is a diagram 1700 illustrating an example of various methods and/or processes according to some aspects of the present disclosure. In some configurations, such methods and/or processes may be operational, performed, and/or implemented in the scheduled entity 204 (e.g., a UE, a device), where the scheduled entity 204 may be a sidelink transmitter. Although the description provided below with reference to FIG. 17 makes reference to a device, one of ordinary skill in the art will understand that such methods and/or processes may be operational, performed, and/or implemented in various apparatus and in various arrangements, sequences, and/or orders without necessarily deviating from the scope of the present disclosure. One of ordinary skill in the art will appreciate that any aspect(s) of the methods and/or processes described with reference FIG. 17 may be included in, added to, substituted for, or incorporated into, and/or otherwise used to modify any other aspect(s) described with reference to FIGS. 1-16 without necessarily deviating from the scope of the present disclosure.

At block 1702, the device may obtain a grant, in a control channel, to conduct device-to-device communication during a predefined period. The grant may be obtained from a scheduling entity and the device-to-device communication may be via a link (e.g., a radio link) between the device and a second device that is different from the scheduling entity. In some aspects, the scheduling entity may be a network access node. In some aspects, the network access node may be an eNodeB (eNB) or an access point (AP). The grant may allocate channels (e.g., blocks of time and frequency) within which various types or categories of communication may be conducted (e.g., an RTS channel, a CTS channel, a data channel). In one aspect, the grant may be a generic grant for device-to-device communication. In one aspect, the grant may be a link-specific grant for device-to-device communication. In one aspect, the device-to-device communication may be a sidelink communication. In one aspect, an RTS channel, a CTS channel, and a data channel are allocated within in the predefined period to facilitate the device-to-device communication during the predefined period. The predefined period may be referred to as a TTI, a frame, a subframe, a slot, or various other predefined periods as known to those of skill in the art. For example, the communication circuit 440 shown and described above in reference to FIG. 4 may obtain the grant.

At block 1704, the device may send a ready-to-send (RTS) message in an RTS channel at an RTS channel power. In one aspect, the RTS channel power may be determined based on a historical record of the RTS channel and/or the data channel, or a predetermined value, if the historical record of the RTS channel and/or the data channel is not established. For example, the communication circuit 440 shown and described above in reference to FIG. 4 may send the RTS message.

At block 1706, the device may obtain, responsive to the RTS message, a clear-to-send (CTS) message in a CTS channel, the CTS message including an indication of quality of the RTS channel. According to one aspect, the indication of quality may be based on the RTS channel power. According to one aspect, the indication of quality may be a channel quality indicator (CQI) based on the RTS channel power. For example, the communication circuit 440 shown and described above in reference to FIG. 4 may obtain the CTS message.

At block 1708, the device may determine a data channel power based on the indication of quality. In some aspects, the device may determine to set the data channel power to a value that is less than the RTS channel power when the indication of quality is better than a predetermined indication of quality (e.g., expected indication of quality). In some aspects, the device may determine to reduce interference at other devices (e.g., within a nearby geographic area) when sending the data message by determining to set the data channel power to a value that is less than the RTS channel power. In other words, for example, the device may take an action of reducing interference at other devices when sending the data message by determining to set the data channel power to a value that is less than the RTS channel power. For example, the processing circuit 442 shown and described above in reference to FIG. 4 may determine the data channel power.

At block 1710, the device may optionally determine a modulation and coding scheme (MCS) to be used in data transmission based on the indication of quality. For example, the processing circuit 442 shown and described above in reference to FIG. 4 may optionally determine the MCS.

At block 1712, the device may send a data message in a data channel at the data channel power, wherein the RTS channel, the CTS channel, and the data channel are allocated within in a predefined period to facilitate device-to-device communication during the predefined period. According to some aspects, the RTS message and data message may be sent via a first radio link from the device to a second device without traversing a network access node. For example, the communication circuit 440 shown and described above in reference to FIG. 4 may send a data message in the data channel at the data channel power.

In some aspects, the CTS channel precedes the data channel in time. Accordingly, the power of the data channel can be adjusted/set to a level that is less than the RTS channel power (e.g., if conditions are met) before data is transmitted by the device in the data channel, all during the predefined period.

In some aspects, the aspects described in connection with FIG. 17 may be repeated during each succeeding predefined time (e.g., repeated during each TTI, subframe, or slot allocated for sidelink communication). Accordingly, in some implementations, dynamic power control for sidelink data transmission can be achieved on a TTI-by-TTI basis (or on a frame-by-frame, subframe-by-subframe, or slot-by-slot basis) using real-time (or instantaneous) indications of channel quality obtained in each TTI. Thus, in sidelink for example, RTS channel power and data channel power can be different within a given TTI. Moreover, the data channel power can be adjusted in a given TTI based on a real time or instantaneous indication of channel quality in the TTI (obtained before the data is sent). This stands in contrast to tying the data channel power to the RTS channel power (e.g., in a one-to-one ratio), and adjusting both power levels based on historical information about the RTS channel.

Figure 18:
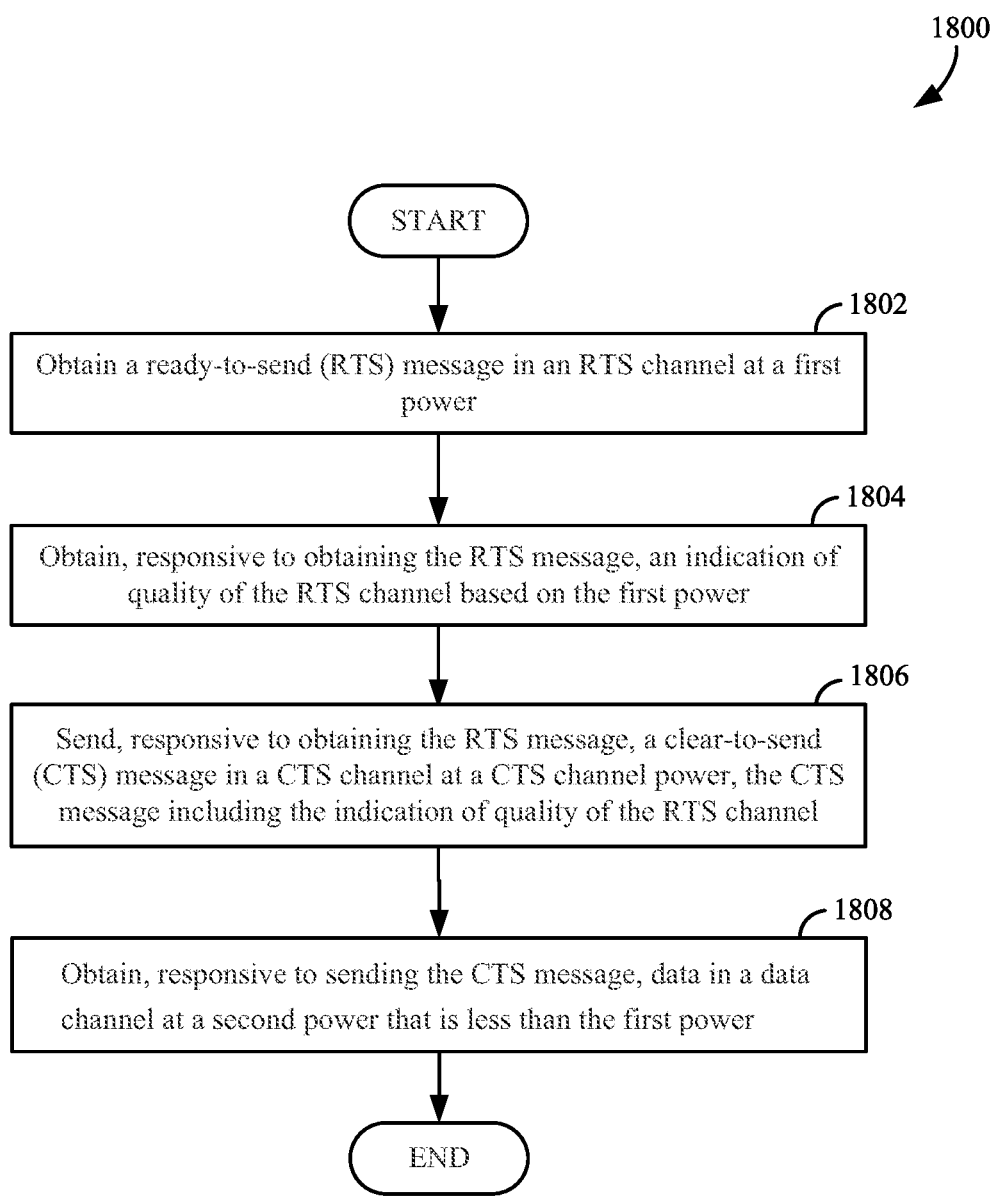
FIG. 18 is a diagram illustrating another example of various methods and/or processes according to some aspects of the present disclosure.

FIG. 18 is a diagram 1800 illustrating another example of various methods and/or processes according to some aspects of the present disclosure. In some configurations, such methods and/or processes may be operational, performed, and/or implemented in the scheduled entity 204 (e.g., a UE, a device), where the scheduled entity 204 may be a sidelink receiver. Although the description provided below with reference to FIG. 18 makes reference to a device, one of ordinary skill in the art will understand that such methods and/or processes may be operational, performed, and/or implemented in various apparatus and in various arrangements, sequences, and/or orders without necessarily deviating from the scope of the present disclosure. One of ordinary skill in the art will appreciate that any aspect(s) of the methods and/or processes described with reference FIG. 18 may be included in, added to, substituted for, or incorporated into, and/or otherwise used to modify any other aspect(s) described with reference to FIGS. 1-17 without necessarily deviating from the scope of the present disclosure.

At block 1802, the device may obtain a ready-to-send (RTS) message in an RTS channel at a first power. The first power may be affected by many things in the RTS channel, including, for example, physical obstacles, and attenuation due to atmospheric conditions. For example, the communication circuit 440 shown and described above in reference to FIG. 4 may obtain the RTS message in the RTS channel at the first power.

At block 1804, the device may obtain, responsive to obtaining the RTS message, an indication of quality of the RTS channel based on the first power. In other words, in one non-limiting example, the quality of the RTS channel may be determinable based on the level of power, for example, of a reference signal included in the RTS message. In some aspects, the device may determine the indication of quality as a channel quality indicator (CQI) based on the first power. For example, the communication circuit 440 shown and described above in reference to FIG. 4 may obtain the indication of quality of the RTS channel based on the first power.

At block 1806, the device may send, responsive to obtaining the RTS message, a clear-to-send (CTS) message in a CTS channel at a CTS channel power, the CTS message including the indication of quality of the RTS channel. In this way, the device (e.g., a sidelink receiver) may provide an indication of the quality of the RTS channel to the device that sent the RTS message (e.g., a sidelink transmitter). The device that sent the RTS message (e.g., a sidelink transmitter) may use the indication of the quality of the RTS channel to determine, prior to sending data on a data channel that will more likely than not be degraded to the same extent as the RTS channel, whether it can send the data at the same power as used in the RTS channel or if it can reduce the power such that the data channel power is less than the RTS channel power. Accordingly, at block 1808, the device (e.g., the sidelink receiver) may obtain, responsive to sending the CTS message, data in a data channel at a second power, wherein the second power is less than the first power. The reduction in power, from the first power to the second power, may allow the device sending the data (e.g., the sidelink transmitter) to reduce interference that would otherwise be caused to other devices. The other devices may be geographically nearby to the device (e.g., the sidelink receiver) as well as the device sending the data (e.g., the sidelink transmitter). Furthermore, the RTS channel, the CTS channel, and the data channel may be allocated within a predefined period to facilitate device-to-device communication during the predefined period. Accordingly, to facilitate the selection of a data channel power (e.g., by the sidelink transmitter), the CTS channel may precede the data channel in time. For example, the communication circuit 440 shown and described above in reference to FIG. 4 may send the CTS message in the CTS channel at the CTS channel power.

In some aspects, the aspects described in connection with FIG. 18 may be repeated during each succeeding predefined time (e.g., repeated during each TTI allocated for sidelink communication). Accordingly, in some implementations, dynamic power control for sidelink data transmission can be achieved on a TTI-by-TTI basis (or on a frame-by-frame, subframe-by-subframe, or slot-by-slot basis) using real-time (or instantaneous) indications of channel quality obtained in each TTI. Thus, in sidelink for example, RTS channel power and data channel power can be different within a given TTI. Moreover, the data channel power can be adjusted in a given TTI based on a real time or instantaneous indication of channel quality in the TTI (obtained before the data is sent). This stands in contrast to tying the data channel power to the RTS channel power (e.g., in a one-to-one ratio), and adjusting both power levels based on historical information about the RTS channel.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Although the examples described herein (e.g., with reference to FIGS. 1-12) may describe certain features, operations, processes, methods, and/or aspects from the perspective of a scheduled entity 204 (e.g., UE), one of ordinary skill in the art will understand that corresponding features, operations, processes, methods, and/or aspects from the perspective of the scheduling entity 202 (e.g., base station, cell, and/or other network entity) are readily ascertainable and understood from the present disclosure and, therefore, would not deviate from the scope of the present disclosure. Several aspects of a wireless communication network have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" may be used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of communication by a sidelink receiver device, the method comprising:
   receiving a ready-to-send (RTS) message in an RTS channel at a received RTS channel power;
   receiving a different dynamic clear-to-send (CTS) transmit power scaling parameter each transmission time interval that is also different from a pre-assigned constant parameter for CTS power control stored at the sidelink receiver device and is a multiplier used to increase or decrease CTS channel power on a transmission time interval (TTI)-by-TTI basis and is changed on the TTI-by-TTI basis;
   generating a CTS message responsive to the RTS message;
   calculating a CTS channel power as a function of at least the dynamic CTS transmit power scaling parameter and the received RTS channel power; and
   sending the CTS message in a CTS channel at the calculated CTS channel power.

2. The method of claim 1, further comprising:
   receiving the dynamic CTS transmit power scaling parameter from at least one of:
   a scheduling entity via a radio resource control (RRC) message,
   the scheduling entity via a control channel message, or
   a sidelink transmitter via the RTS message.

3. The method of claim 1, wherein the dynamic CTS transmit power scaling parameter is a multiplier used to increase or decrease a size of a CTS channel interference protection zone on the TTI-by-TTI basis.

4. The method of claim 1, further comprising:
   changing the CTS channel power, relative to a power that would be obtained as a function of the pre-assigned constant parameter for CTS power control stored at the sidelink receiver device and the received RTS channel power, to dynamically increase or decrease a size of a CTS channel interference protection zone.

5. An apparatus for wireless communication, configured as a sidelink receiver device, comprising:
   a processor;
   a transceiver communicatively coupled to the processor; and
   a memory communicatively coupled to the processor, wherein the memory stores instructions that when executed by the processor cause the processor to be configured to:
   receive, at the sidelink receiver device, a ready-to-send (RTS) message in an RTS channel at a received RTS channel power;
   receive a different dynamic clear-to-send (CTS) transmit power scaling parameter each transmission time interval that is also different from a pre-assigned constant parameter for CTS power control stored at the sidelink receiver device and is a multiplier used to increase or decrease CTS channel power on a transmission time interval (TTI)-by-TTI basis and is changed on the TTI-by-TTI basis;
   generate a CTS message responsive to the RTS message;
   calculate a CTS channel power as a function of at least the dynamic CTS transmit power scaling parameter and the received RTS channel power; and
   send the CTS message in a CTS channel at the CTS channel power via the transceiver.

6. The apparatus of claim 5, wherein the processor is further configured to:
   receive the dynamic CTS transmit power scaling parameter from at least one of:
   a scheduling entity via a radio resource control (RRC) message,
   the scheduling entity via a control channel message, or
   a sidelink transmitter via the RTS message.

7. The apparatus of claim 5, wherein the processor is further configured to:
   change the CTS channel power, relative to a power that would be obtained as a function of the pre-assigned constant parameter for CTS power control stored at the sidelink receiver device and the received RTS channel power, to dynamically increase or decrease a size of a CTS channel interference protection zone.

8. A method of communication by a transmitting device, the method comprising:
   determining to change a size of a clear-to-send (CTS) interference protection zone of at least one scheduled entity in a plurality of scheduled entities;
   determining a value of a dynamic CTS transmit power scaling parameter, wherein the dynamic CTS transmit power scaling parameter is used to change the size of the CTS interference protection zone by scaling a transmit power of the at least one scheduled entity during a CTS channel, is re-determined to change the value of the dynamic CTS transmit power scaling parameter on a transmission time interval (TTI)-by-TTI basis, is a multiplier used to increase or decrease CTS channel power, and is sent to the scheduled entity on the TTI-by-TTI basis; and sending the dynamic CTS transmit power scaling parameter to the at least one scheduled entity.

9. The method of claim 8, wherein the transmitting device is a scheduling entity or a sidelink transmitter device.

10. The method of claim 8, wherein, when the transmitting device is a scheduling entity, the method further comprises:
sending a grant to authorize device-to-device communication among the plurality of scheduled entities, the grant allocating a clear-to-send (CTS) channel.

11. The method of claim 10, further comprising:
sending the dynamic CTS transmit power scaling parameter via a radio resource control (RRC) message or via a control channel allocated by the grant.

12. The method of claim 8, wherein, when the transmitting device is a scheduling entity, the method further comprises:
determining to change the size of the CTS interference protection zone based on a change to a reliability requirement of a link associated with the scheduled entity.

13. The method of claim 8, wherein, when the transmitting device is a scheduling entity, the method further comprises:
determining to change the size of the CTS interference protection zone based on an evaluation of a link traffic profile, wherein the link traffic profile indicates at least one of a reliability or a latency requirement of a link associated with the scheduled entity.

14. The method of claim 8, wherein, when the transmitting device is a scheduling entity, the method further comprises:
determining the value of the dynamic CTS transmit power scaling parameter based on at least one of a use case, priority, quality of service (QoS), or buffer status.

15. The method of claim 8, wherein when the transmitting device is a sidelink transmitter device linked in device-to-device communication with a sidelink receiver device, the method further comprises:
determining to change the size of the CTS interference protection zone based on a change to at least one of a reliability or a latency requirement of a packet of data to be transported to the sidelink receiver device.

16. The method of claim 8, wherein when the transmitting device is a sidelink transmitter device linked in device-to-device communication with a sidelink receiver device, the method further comprises:
determining to change the size of the CTS interference protection zone based on an evaluation of an amount of data to be transported to the to the sidelink receiver device.

17. An apparatus for wireless communication, comprising:
a processor;
a transceiver communicatively coupled to the processor; and
a memory communicatively coupled to the processor,
wherein the memory stores instructions that when executed by the processor cause the processor to be configured to:
determine to change a size of a clear-to-send (CTS) interference protection zone of at least one scheduled entity in a plurality of scheduled entities;
determine a value of a dynamic CTS transmit power scaling parameter, wherein the dynamic CTS transmit power scaling parameter is used to change the size of the CTS interference protection zone by scaling a transmit power of the at least one scheduled entity during a CTS channel, is re-determined to change the value of the dynamic CTS transmit power scaling parameter on a transmission time interval (TTI)-by-TTI basis, is a multiplier used to increase or decrease CTS channel power, and is sent to the scheduled entity on the TTI-by-TTI basis; and
send the dynamic CTS transmit power scaling parameter to the at least one scheduled entity via the transceiver.

18. The apparatus of claim 17, wherein the apparatus is a scheduling entity or a sidelink transmitter device.

19. The apparatus of claim 17, wherein, when the apparatus is a scheduling entity, the processor is further configured to:
send a grant to authorize device-to-device communication among the plurality of scheduled entities, the grant allocating a clear-to-send (CTS) channel.

20. The apparatus of claim 19, wherein the processor is further configured to:
send the dynamic CTS transmit power scaling parameter via a radio resource control (RRC) message or via a control channel allocated by the grant.

21. The apparatus of claim 17, wherein, when the apparatus is a scheduling entity, the processor is further configured to:
determine to change the size of the CTS interference protection zone based on a change to a reliability requirement of a link associated with the scheduled entity.

22. The apparatus of claim 17, wherein, when the apparatus is a scheduling entity, the processor is further configured to:
determine to change the size of the CTS interference protection zone based on an evaluation of a link traffic profile, wherein the link traffic profile indicates at least one of a reliability or a latency requirement of a link associated with the scheduled entity.

23. The apparatus of claim 17, wherein, when the apparatus is a scheduling entity, the processor is further configured to:
determine the value of the dynamic CTS transmit power scaling parameter based on at least one of a use case, priority, quality of service (QoS), or buffer status.

24. The apparatus of claim 17, wherein the apparatus is a sidelink transmitter device linked in device-to-device communication with a sidelink receiver device, the processor is further configured to:
determine to change the size of the CTS interference protection zone based on a change to at least one of a reliability or a latency requirement of a packet of data to be transported to the sidelink receiver device.

25. The apparatus of claim 17, wherein the apparatus is a sidelink transmitter device linked in device-to-device communication with a sidelink receiver device, the processor is further configured to:
determine to change the size of the CTS interference protection zone based on an evaluation of an amount of data to be transported to the to the sidelink receiver device.

* * * * *